United States Patent [19]
Kanai et al.

[11] Patent Number: 5,973,081
[45] Date of Patent: *Oct. 26, 1999

[54] MODIFIED POLYACETAL AND METHOD OF PRODUCING THE SAME

[75] Inventors: Hiroyuki Kanai, Fuji; Hajime Serizawa, Mishima; Katsuhei Ohnishi, Fuji; Eiji Masuda, Fuji; Kaoru Yamamoto, Fuji, all of Japan

[73] Assignee: Polyplastics Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/663,279

[22] PCT Filed: Oct. 19, 1995

[86] PCT No.: PCT/JP95/02138

§ 371 Date: Jun. 7, 1996

§ 102(e) Date: Jun. 7, 1996

[87] PCT Pub. No.: WO96/13535

PCT Pub. Date: May 9, 1996

[30] Foreign Application Priority Data

Oct. 27, 1994 [JP] Japan ..................................... 6-288918
Apr. 12, 1995 [JP] Japan ..................................... 7-112524

[51] Int. Cl.[6] ............................ C08L 61/02; C08L 75/04; C08L 67/00; C08L 77/00
[52] U.S. Cl. .......................... 525/398; 525/399; 525/400; 525/401; 525/402
[58] Field of Search ..................................... 525/398, 399, 525/400, 401, 402

[56] References Cited

U.S. PATENT DOCUMENTS

| | | | |
|---|---|---|---|
| 3,546,321 | 12/1970 | Jabloner et al. | 260/874 |
| 3,658,912 | 4/1972 | Raimund et al. | 260/606 |
| 3,997,613 | 12/1976 | Lenke et al. | 260/609 R |

FOREIGN PATENT DOCUMENTS

| | | |
|---|---|---|
| 2000866 | 9/1969 | France . |
| 1570857 | 1/1970 | Germany . |
| 43-23467 | 10/1968 | Japan . |
| 47-19425 | 6/1972 | Japan . |
| 49-74790 | 11/1974 | Japan . |
| 49-130489 | 12/1974 | Japan . |
| 50-44286 | 4/1975 | Japan . |
| 58-18383 | 4/1983 | Japan . |
| 58-18384 | 4/1983 | Japan . |
| 59-36644 | 9/1984 | Japan . |
| 60-6969 | 2/1985 | Japan . |
| 60-219252 | 11/1985 | Japan . |
| 3-21618 | 1/1991 | Japan . |
| 3-21619 | 1/1991 | Japan . |
| 3093822 | 4/1991 | Japan . |
| 5025238 | 5/1993 | Japan . |
| 52142212 | 8/1993 | Japan . |
| 1172741 | 9/1967 | United Kingdom . |
| 1111856 | 5/1968 | United Kingdom . |
| 1222547 | 2/1971 | United Kingdom . |
| 1224425 | 3/1971 | United Kingdom . |

*Primary Examiner*—Patrick D. Niland
*Attorney, Agent, or Firm*—Nixon & Vanderhye P.C.

[57] ABSTRACT

A modified polyacetal is obtainable by heating 0.1 to 30 parts by weight of (B) a polymerizable compound having a modifying group such as an epoxy group, a carboxyl group or an acid anhydride group relative to 100 parts by weight of (A) a base polyacetal and introducing the modifying group of the polymerizable compound to the base polyacetal. The base polyacetal (A) includes (A1) a polyacetal selected from polyoxymethylene homopolymers and copolymers, and (A2) a polymerizable polyacetal having a functional group comprising a polymerizablly unsaturated bond. The introduction efficiency of the modifying group can be enhanced by adding 0.01 to 2.5 parts by weight of (C) a free-radical initiator relative to 100 parts by weight of the total amount of the components (A) and (B), and mixing the resultant mixture under a molten state of the polyacetal. According to such method, the affinity of the polyacetal is improved by introducing the modifying group to the base polyacetal with ease and high efficiency.

50 Claims, No Drawings

MODIFIED POLYACETAL AND METHOD OF PRODUCING THE SAME

TECHNICAL FIELD

The present invention relates to a modified polyacetal having improved affinities for various polymers, additives, fillers and the like and is useful for composite or compounded application, and excellent in secondary processabilities such as adhesion or painting (coating), and to a method of producing the same.

BACKGROUND ART

A polyacetal has excellent mechanical strength, slidability, heat resistance, chemical resistance, moldability (formability) and electrical characteristics, and hence is used as an engineering plastic in many fields. Further, a variety of performances have been practically required of such polyacetal accompanied with expanding applications.

On the other hand, the polyacetal has a high crystallinity and hence remarkably poor in affinity or compatibility for other materials. Therefore, it is difficult to modify or reform the polyacetal by means of blending and compounding with other polymers, additives or reinforcing agents and the like, and adhesive properties of the polyacetal with respect to a paint, a printing ink, a coloring agent or an adhesive can hardly be improved. By way of illustration, when an elastomer is blended with the polyacetal for improving impact resistance, satisfactory impact characteristics can not be imparted to the resultant molded article because of poor affinity and compatibility of the polyacetal for the elastomer. Further, the surface of the molded article is peeled off due to poor dispersibility of the elastomer, and hence the external appearance of the molded article is significantly sacrificed. Moreover, addition of a stabilizer, lubricant or other additive to the polyacetal for modification or reforming results in leaching of the additive to the surface of the molded article, and hence the appearance of the molded article is markedly deteriorated and functions of the additive can not be utilized effectively. Accordingly, application or use of the polyacetal may practically be limited to a great extent.

For the purpose of improving affinity of the polyacetal, it is useful to modify the polyacetal by introducing a modifying group into the polyacetal. As such modifying method of the polyacetal by introduction of a modifying group, there have been proposed a variety of technologies. By way of an example, Japanese Patent Publication No. 23467/1968 (JP-B-43-23467) proposes a process which comprises introducing an amino group into a base polyacetal with the use of aminoaldehyde as a comonomer. According to this process, however, boron trifluoride or other Lewis acid used as a polymerization catalyst is easily or readily reacted with the amino group, so that polymerization efficiency and hence characteristics as an engineering plastic are sacrificed.

Japanese Patent Publication No. 19425/1972 (JP-B-47-19425) proposes a process which comprises preparing a polymer with the use of a cyclic ether or cyclic acetal each having a nitro group as a comonomer, and reduction the resultant polymer to convert the nitro group into an amino group. However, in this process, the polymer is liable to be decomposed in the reducing step, and hence the characteristics of the obtained polymer are not satisfactorily high as an engineering plastic.

Japanese Patent Application Laid-open No. 21618/1991 (JP-A-3-21618) and Japanese Patent Application Laid-open No. 21619/1991 (JP-A-3-21619) propose production of a polyacetal copolymer having a hydroxyl group, an acyloxy group, for instance, with the use of a comonomer. Japanese Patent Application Laid-open No. 25238/1993 (JP-A-5-25238) offers a process which comprises copolymerizing trioxane and a cyclic ether or cyclic formal each having a nitrile group, a carboxyl group, an ester group or an amide group. According to these technologies, however, polymerization reactivity is poor so that a copolymer having a high molecular weight can hardly be obtained in a high yield. Japanese Patent Application Laid-open No. 93822/1991 (JP-A-3-93822) proposes a polyacetal copolymer having a nitrile group. However, this process requires an extremely large quantity of a polymerization catalyst and hence is not suitable for practical use.

As described above, in the processes in which copolymerization is conducted using a comonomer having a modifying group, the comonomer adversely affects on the polymerization reaction and, thereby, a smooth proceeding of the copolymerization is deteriorated and the polymerization degree can hardly be enhanced. In other words, the technologies, which comprise introducing a modifying group directly into a polyacetal with the use of a comonomer having a modifying group, each provide a decreased polymerization reactivity and a copolymer having a high molecular weight can hardly be provided in a high yield.

There has been also proposed incorporation of a polymerizable compound into a reinforced polyacetal resin composition for the purpose of improving reinforcing effect by means of a reinforcing agent. By way of an example, Japanese Patent Publication No. 6969/1985 (JP-B-60-6969) discloses a production method of a reinforced polyoxymethylene resin composition which comprises melting and kneading concurrently, in substance, a mixture prepared by adding, to 100 parts by weight of a polyoxymethylene resin, 5 to 150 parts by weight of an inorganic filler, and 0.1 to 20 parts by weight of an unsaturated polyester. This literature also describes that a radical polymerization initiator may preferably be molten and kneaded concurrently with the above mixture. Japanese Patent Publication No. 18383/1983 (JP-B-58-18383) discloses a production method of a carbon fiber-reinforced polyacetal resin composition which comprises kneading, in substantial concurrence, a mixture comprising 5 to 150 parts by weight of a carbon fiber, 0.1 to 20 parts by weight of an unsaturated polyester, 0 to 5 parts by weight of a radical polymerization initiator and 100 parts by weight of a polyacetal resin.

However, since the composition previously comprises the specific reinforcing agent, it is necessary to prepare the resin composition for each of applications. By way of an example, the carbon fiber-reinforced polyacetal resin composition shows gray through black color depending on the content of the carbon fiber so that it can not be applied to a chromatic colored molded article. Further, the molding conditions must be strictly controlled since the unsaturated polyester is apt to be cross-linked in the melting and kneading step, and appearance and quality of the molded article are deteriorated due to a granule, typically speaking, formed by crosslinking of the unsaturated polyester.

Japanese Patent Publication No. 18384/1983 (JP-B-58-18384) discloses a carbon fiber-reinforced polyacetal resin composition as produced by heating and kneading, concurrently in substance, 100 parts by weight of a polyacetal resin, 5 to 150 parts by weight of a carbon fiber, 0.01 to 5 parts by weight of a radical polymerization initiator and 0.1 to 20 parts by weight of acrylamide, N-methylolacrylamide or divinylbenzene. When the crosslinkable divinylbenzene is used in this process, disadvantages similar to the composition as produced using the unsaturated polyester would be present.

Furthermore, Japanese Patent Publication No. 36644/1984 (JP-B-59-36644) discloses a reinforced polyoxymethylene resin composition comprising a heated and kneaded product containing 100 parts by weight of polyoxymethylene, 5 to 150 parts by weight of a non-carbonaceous inorganic filler, 0.01 to 5 parts by weight of a radical polymerization initiator and 0.1 to 20 parts by weight of acrylamide or N-methylolacrylamide. Japanese Patent Application Laid-open No. 219252/1985 (JP-A-60-219252) discloses a glass fiber-reinforced polyacetal resin composition as produced by adding a glass fiber, a peroxide and a silane-based coupling agent to a polyacetal resin.

Since the unmodified polyacetal is poor in wettability with respect to a reinforcing agent or filler, the above mentioned composition can hardly provide a homogeneous dispersion of the reinforcing agent or filler with a high efficiency even when kneaded. Further, coexistence of the reinforcing agent or filler significantly sacrifices modification efficiency. Therefore, even when the composition is molded, functions or properties of the reinforcing agent or filler can not effectively be exhibited and the molded article may occasionally be imparted with excellent mechanical characteristics, electrical characteristics or other characteristics.

In particular, these technologies, in which the filler or radical polymerization initiator is employed, can hardly be referred to as effective modifying processes, since introduction efficiency of the modifying group is extremely poor and the polyacetal is decomposed or degraded.

Moreover, when the radical polymerization initiator and the polyacetal are molten and kneaded, the polyacetal resin is decomposed and degraded, due to the radical polymerization initiator, to give a decreased molecular weight. For instance, the above-mentioned Japanese Patent Application Laid-open No. 219252/1985 (JP-A-60-219252) discloses that melting and kneading of the peroxide and the polyacetal results in oxidative decomposition of the polyacetal resin due to the radical polymerization initiator. Further, Japanese Patent Application Laid-open No. 74790/1974 (JP-A-49-74790) discloses a process for controlling an average molecular weight of a polyacetal resin which comprises decomposing a polyoxymethylene by contacting the same with an organic peroxide in a molten state of the polyoxymethylene, and British Patent No. 1172741 discloses a process for reducing an average molecular weight which comprises treating a polyacetal with a peroxide in the presence of a dispersing agent or a solvent. As described above, the use of a radical polymerization initiator, in particular an organic peroxide, results in decomposition of the polyacetal, so that it is difficult to modify or reform the polyacetal by means of the radical polymerization initiator with retaining its high molecular weight, mechanical characteristics and electrical characteristics. Probably for this reason, Japanese Patent Application Laid-open No. 214212/1993 (JP-A-5-214212) proposes reforming (modification) of a polyoxymethylene resin by adding a modified polyolefin modified with a polymerizable monomer having a glycidyl group and an amide bond, without direct modification of the polyacetal.

Still more, N-methylolacrylamide may easily be self-condensed to form a dimer and be liable to be crosslinked, so that moldability or formability of the composition is deteriorated or appearance and quality of the molded article are sacrificed due to crosslinking. Further, since acrylamide is reacted with formaldehyde formed in kneading with the polyacetal to give the above N-methylolacrylamide, similar problems to the above would arise.

It is, therefore, an object of the present invention to provide a modified polyacetal which is imparted with high affinities for a polymer, reinforcing agent and/or filler and a method of producing the same.

It is another object of the invention to provide a modified polyacetal having a high molecular weight despite being introduced with a modifying group, and a method of producing such modified polyacetal.

A further object of the present invention is to provide a modified polyacetal with inhibiting a molding processabilities and recycling properties (reutility), and its production method.

It is a yet another object of the invention to provide a modified polyacetal which is introduced with a comparatively large quantity of a modifying group with a high efficiency into a base polyacetal, and a method of producing the modified polyacetal.

A still further object of the invention is to provide a production method of a modified polyacetal which insures inhibition of deterioration of its performance due to decomposition and/or degradation without interfering with formation reaction of a polyacetal, and provides an efficient modification (reforming) of the polyacetal with retaining inherently excellent performances of such polyacetal.

It is a further object of the present invention to provide a method of producing a modified polyacetal which insures, despite using a radical initiator, modification of a polyacetal with a high efficiency by the compound having a modifying group, to inhibit decrease of its molecular weight.

A yet further object of the invention is to provide a production method of a modified polyacetal which is able to provide a polymer having a molecular weight within a comparatively broad range.

It is a still another object of the invention to provide a method of producing a modified polyacetal which insures direct introduction of a modifying group into a polyacetal with a high efficiency in a simple and easy manner without the coexistence of a reinforcing agent or filler.

DISCLOSURE OF THE INVENTION

The present inventors made intensive investigations to achieve the above objects, and, as a result, found that (1) heating of a polyacetal and a polymerizable compound having a modifying group results in an efficient grafting of the polymerizable compound in a simple and easy manner and hence provides improvement of affinities of the polyacetal, and (2) by heating and reacting a polymerizable polyacetal having a polymerizable functional group, and a polymerizable compound having a modifying group, if necessary in the presence of a free-radical initiator (radical generator), the modifying group can easily be added and introduced into the polyacetal with a high efficiency and affinities of the polyacetal can be improved with restraining decrease or deterioration of molecular weight and performances (properties) of the polyacetal. The present invention has been accomplished on the basis of the above findings.

Thus, the modified polyacetal of the invention is introduced with a residue of a polymerizable compound having at least one modifying group selected from the group consisting of an epoxy group, a carboxyl group, an acid anhydride group, an ester group, a hydroxyl group, an ether group, an amide group, an amino group, a nitrile group, an isocyanate group, an imide group, a cycloalkyl group, an aryl group and a heterocyclic group having a nitrogen atom as a hetero atom into a base polyacetal. The introduced amount of the residue of the polymerizable compound is, for example, about 0.1 to 30% by weight relative to the base polyacetal. The base polyacetal includes a polyacetal and a polymerizable polyacetal having a functional group comprising a polymerizable unsaturated bond.

The polymerizable compound having the modifying group may have plural ethylenically unsaturated bonds per molecule, but for the purpose of inhibiting an excess crosslinkage in the modifying stage, it may practically have one ethylenically unsaturated bond per molecule. As the polymerizable compound, a compound having a boiling point of not lower than 70° C. at atmospheric (ordinary) pressure may generally be employed. Incidentally, the nitrogen atom of the amide group as the modifying group may be bonded with a non-condensable modifying group. Further, the heterocyclic group includes a cyclic imino ester group and a cyclic imino ether group, typically speaking.

According to the method of the invention, a modified polyacetal is produced by heating the base polyacetal and the polymerizable compound having the modifying group and introducing a residue of the polymerizable compound into the base polyacetal. The polymerizable polyacetal as the base polyacetal can be obtained by, for example, a process which comprises copolymerizing a cyclic ether or cyclic acetal each having a polymerizable double bond as a comonomer in a polymerization process using formaldehyde or trioxane as a principle monomer, a process in which polymerization is conducted in the presence of a chain transfer agent having a polymerizable double bond, a process which comprises esterifying a terminal of a polyacetal formed by polymerization with a carboxylic acid having a polymerizable unsaturated bond or its acid anhydride, or other technologies.

The modification of the polyacetal may be carried out by various technologies, such as a process which comprises mixing (A) the base polyacetal and (B) the polymerizable compound having the modifying group with melting the base polyacetal in the presence of (C) a free-radical initiator. In this process, (C) the free radical initiator may be added in a co-existence system of (A) the base polyacetal and (B) the polymerizable compound having the modifying group to mix the resultant mixture under a molten state of the base polyacetal, or (C) free-radical initiator (C) may be added to a compounded mixture or a molten mixture of (A) the base polyacetal and (B) the polymerizable compound having a modifying group to mix the resultant mixture in a molten state of the base polyacetal. As the free-radical initiator (radical generating agent), use can be made of an organic peroxide or an azo compound. The proportion of (B) the polymerizable compound having a modifying group may be selected within the range of about 0.1 to 30 parts by weight relative to 100 parts by weight of (A) the base polyacetal, and the amount of (C) the free-radical initiator may be selected in the range of about 0.01 to 2.5 parts by weight relative to 100 parts by weight of the total amount of (A) the base polyacetal and (B) polymerizable compound.

According to the above method, when (B) the polymerizable compound having a modifying group is added to a molten mixture of (A) the base polyacetal and (C) the free-radical initiator and the resultant mixture is mixed under a molten state of the base polyacetal, a modified polyacetal having a comparatively low molecular weight and introduced with the modifying group of the polymerizable compound with a high efficiency can be prepared.

The term "residue of the polymerizable compound" as used in the present specification means and includes not only a monomer unit of a polymerizable compound but also its polymer (for example, a dimer, a trimer, a tetramer or a polymer component each formed by polymerization). The term "graft polymerization" means bonding of the residue (unit) of the polymerizable compound to a backbone chain (main chain), a side chain or a terminal. The term "the non-self condensable modifying group" indicates a modifying group which is condensable without an interpretation of a reacting component, such as methylol group. Further, an acrylic monomer and a methacrylic monomer are generically referred to as "the (meth)acrylic monomer" otherwise specifically mentioned. Furthermore, a polyacetal having a functional group comprising an ethylenically unsaturated bond or other polymerizable unsaturated bond may simply referred to as "the polymerizable polyacetal".

DETAILED DESCRIPTION OF THE INVENTION

[Base Polyacetal]

The base polyacetal (A) constituting the modified polyacetal of the invention may be classified into (A1) a polyacetal, and (A2) a polymerizable polyacetal having a functional group comprising an ethylenically unsaturated bond or other polymerizable unsaturated bond. The polyacetal (A1) and the polymerizable polyacetal (A2) can be distinguished from each other by the absence or presence of the functional group comprising an ethylenically unsaturated bond or other polymerizable unsaturated bond. The base polyacetal (A) will have a melting point between about 120° C. to 185° C.

[(A1) Polyacetal]

The polyacetal (A1) is a high molecular weight compound comprising an oxymethylene group ($-CH_2O-$) as a main constitutive unit. The polyacetal includes a polyoxymethylene homopolymer and a polyacetal copolymer. This copolymer comprises, in addition to the oxymethylene group, an oxyalkylene unit having about 2 to 6 carbon atoms, preferably about 2 to 4 carbon atoms (e.g. oxyethylene group ($-CH_2CH_2O-$), oxypropylene group, oxytetramethylene group, etc.), as a constitutive unit. More preferably, the copolymer comprises an oxyethylene group as a constitutive unit. That is, The copolymer is a copolymer containing at least one oxyalkylene unit $-(CH_2)_nO-$, (wherein n denotes an integer of 2 to 6) as a copolymerizable unit in a part of the backbone chain. The backbone chain of the base polyacetal may contain other copolymerizable unit in addition to the oxyalkylene unit.

The proportion of the oxyalkylene group having about 2 to 6 carbon atoms (content of the comonomer unit) can optionally be selected from a range according to intended use of the polyacetal, and is, for instance, about 0.1 to 30 mole % and preferably about 1 to 20 mole % based on the total of the polyacetal. The content of the comonomer unit may practically be not greater than 10 mole % (e.g. about 0.03 to 10 mole %), preferably about 0.03 to 7 mole % (e.g. about 0.05 to 5 mole %) and more preferably about 0.1 to 5 mole %.

The polyacetal copolymer may be a copolymer comprising plural components, such as a copolymer comprising two components and a terpolymer comprising three components. The polyacetal copolymer may generally be a random copolymer, but it may also be a block copolymer, a graft copolymer or others. The polyacetal may have not only a linear structure but also a branched structure, and it may have a crosslinking structure. Further, the terminal of the polyacetal may be stabilized by, for example, esterification with acetic acid, propionic acid, butyric acid or other carboxylic acids. The polymerization degree, branching degree and crosslinking degree of the polyacetal are not particularly limited as far as the polyacetal being moldable (formable) by melting.

Preferred polyacetal includes a polyoxymethylene, a polyacetal copolymer (e.g. a copolymer comprising at least an oxymethylene unit and an oxyethylene unit). From the view point of heat stability, a polyacetal copolymer is desirable.

The polyacetal (A1) may be prepared by polymerizing, for example, formaldehyde, paraformaldehyde, acetaldehyde or other aldehydes, trioxane, ethylene oxide, propylene oxide, 1,3-dioxolan or other cyclic ethers.

[(A2) Polymerizable Polyacetal]

The polymerizable polyacetal (A2) is a polyacetal having a polymerizable unsaturated bond (an ethylenically unsaturated bond, an acetylene bond), and comprises similar components to the polyacetal (A1) except for having a functional group comprising the polymerizable unsaturated bond. Namely, the polymerizable polyacetal (A2) is also a high molecular weight compound containing an oxymethylene group (—CH$_2$O—) as a main constitutive unit, and it may be a copolymer having the oxymethylene unit as a main repeating unit and containing such a comonomer unit as mentioned above.

The polymerizable unsaturated bond includes an ethylenically unsaturated bond such as a vinyl group and allyl group, and an acetylene bond such as an ethynyl group, each of which can be additionally reactive to the polymerizable compound. Typical example of the polymerizable unsaturated bond includes a vinyl ether group, an allyl group, an isopropenyl group, a vinylphenyl group and an ethynyl group.

The polyacetal having a polymerizable unsaturated bond (A2) may roughly be classified into, according to the production process, (A2a) a polymerizable polyacetal having an unsaturated bond in a random portion of the polyacetal as a side chain, and (A2b) a polymerizable polyacetal having an unsaturated bond in the terminal of the polyacetal molecular.

The former polymerizable polyacetal (A2a) can be prepared by polymerization of formaldehyde or trioxane as a main monomer and, as a comonomer, at least one compound selected from the group consisting of cyclic ethers and cyclic formals each of which has a functional group containing a polymerizable unsaturated bond, and is copolymerizable with the main monomer. The comonomer may only have a functional group comprising an ethylenically unsaturated bond or other polymerizable unsaturated bond as a substituent. The preferred polymerizable unsaturated bond includes an ethylenically unsaturated bond such as a vinyl group or an allyl group. As such comonomer, there may be mentioned a cyclic ether or cyclic formal (e.g. ethylene oxide, 1,3-dioxolan, 1,3-dioxane, butanediol formal and diethylene glycol formal) having a functional group comprising an ethylenically unsaturated bond or other polymerizable unsaturated bond (e.g. a vinyl ether group, an allyl group, an allyl ether group, an isopropenyl group, a vinylphenyl group, etc.) as a substituent. The preferred comonomer includes, for instance, a compound shown by the following formula (1)

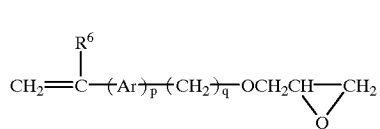

(1)

wherein Ar represents an arylene group or a cycloalkylene group, $R^6$ denotes a halogen atom, a hydrogen atom or a methyl group, P represents 0 or 1, and q denotes an integer of 0 to 3, with a proviso that p and q are not concurrently 0.

In the compound shown by the formula (1), the aryl group includes, phenyl, naphthyl and other groups, and examples of the cycloalkylene group include cycloheptylene, cyclohexylene, cyclooctylene and other $C_{4-10}$ cycloalkylene groups. Preferred coefficient q is 1 or 2, in particular 1.

As the compound shown by the formula (1), there may be mentioned, for example, allyl glycidyl ether, 2-chloroallyl glycidyl ether, 2-bromoallyl glycidyl ether, 2-methylallyl glycidyl ether, 2-vinylethyl glycidyl ether, 4-vinylphenyl glycidyl ether, 2-vinylbenzyl glycidyl ether, 3-vinylbenzyl glycidyl ether, 4-vinylbenzyl glycidyl ether, 2-(4-vinylphenyl)ethyl glycidyl ether and other.

The amount of the comonomer having a polymerizable unsaturated bond can be selected from a broad range not sacrificing polymerizability or other properties, and is, for instance, about 0.001 to 30 mole % (e.g. about 0.001 to 10 mole %), preferably about 0.01 to 8 mole % and more preferably about 0.1 to 5 mole % based on the total of the monomer.

Incidentally, in the polymerization, a common cyclic ether or cyclic formal each of which does not have a polymerizable unsaturated bond (e.g. ethylene oxide, 1,3-dioxolan, 1,3-dioxane, butanediol formal, diethylene glycol formal) may be incorporated as a part of the comonomer to give a multicomponent copolymer containing plural components. The amounts of these cyclic ethers or cyclic formals can be selected from a range according to the composition of the multicomponent copolymer or other factors, and is about 0 to 10 mole % based on the total of the monomer.

The polymerization reaction may be carried out in a conventional manner such as cationic polymerization (ring-opening polymerization in the presence of a cationic active catalyst such as boron trifluoride and an onium salt) or anionic polymerization.

According to the polymerization reaction as above, the polymerizable polyacetal with a structure having the polymerizable unsaturated group as a side chain in a random portion of the polyacetal can be obtained.

The latter polymerizable polyacetal (A2b), that is, the polyacetal having a functional group comprising a polymerizable unsaturated bond in the terminal of the molecular chain, may be obtained by polymerizing trioxane or formaldehyde as a main (principle) monomer, and if necessary together with a common cyclic ether or cyclic formal as mentioned above as a comonomer in the presence of a chain transfer agent having a polymerizable unsaturated bond. The chain transfer agent may only have a polymerizable unsaturated bond, such as the vinyl group, allyl group or other ethylenically unsaturated bonds, and ethynyl group or other acetylene bonds. As the chain transfer agent, use can be made of allyl alcohol, crotonyl alcohol, α-vinylethyl alcohol and other chain transfer agents each having an ethylenically unsaturated bond, propargyl alcohol and other chain transfer agents each having an acetylene bond, and in addition, a compound shown by the following formula (2)

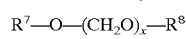

(2)

wherein $R^7$ and $R^8$ represent, the same or different, a group containing a polymerizable unsaturated bond, an alkyl group, a cycloalkyl group, an aryl group or an aralkyl group, at least one of $R^7$ and $R^8$ is a group containing a polymerizable unsaturated bond, and x denotes an integer of 1 to 10.

The functional group containing an ethylenically unsaturated bond in the straight-chain formal compound shown by the formula (2) includes the group having a vinyl group, an isopropenyl group or an allyl group as mentioned above, such as a vinyl ether group and allyl ether group, and the functional group containing an acetylene bond includes, for example, an ethynyl group. As the alkyl group, there may be mentioned methyl, ethyl propyl, isopropyl, butyl or other lower alkyl groups each having about 1 to 4 carbon atoms. Examples of the cycloalkyl group include cyclopentyl, cyclohexyl, cycloheptyl and cyclooctyl groups, and the aryl group includes phenyl and naphthyl groups, for instance. As examples of the aralkyl group, there may be mentioned benzyl, phenetyl and other groups.

In the formula (2), at least one of $R^7$ and $R^8$ may only be a functional group having a polymerizable unsaturated bond, but both of $R^7$ and $R^8$ may practically be functional groups each having a polymerizable unsaturated bond. As x, there may liberally be selected from a range of about 1 to 10, preferably about 1 to 5 and in particular about 1 to 3.

The compound shown by the formula (2) includes, for example, divinyl formal, diethylene glycol divinyl ether, trimethylene glycol divinyl ether, methylene glycol monovinyl ether, dimethylene glycol monovinyl ether and so forth.

The amount of the chain transfer agent can be selected from a range according to the desired introduced amount of the polymerizable unsaturated bond and the molecular weight of the polymerizable polyacetal, and is, for instance, about 0.001 to 2.5% by weight, preferably about 0.005 to 1% by weight, and more preferably about 0.01 to 0.5% by weight relative to the total of the monomer.

The polymerization of the monomer may be conducted by cationically polymerizing or anionically polymerizing the monomer to give a polyacetal having a functional group comprising a polymerizable unsaturated bond in the terminal of the polyacetal chain.

Further, the polymerizable polyacetal (A2b) having a functional group containing a polymerizable unsaturated bond in the terminal of the polyacetal chain can also be obtained by esterifying the terminal of a polyacetal, which is obtainable by polymerization of formaldehyde or trioxane as a main monomer, if necessary together with a cyclic ether or cyclic formal as a comonomer, with a carboxylic acid or acid anhydride each having a polymerizable unsaturated bond (e.g. (meth)acrylic acid, crotonic acid, vinylglycollic acid, maleic acid, maleic anhydride, fumaric acid, itaconic acid and other mono- or di-carboxylic acids each having an ethylenically unsaturated bond or their anhydrides, propiolic acid and other carboxylic acids each having an acetylene bond).

By employing the above methods in combination, the polymerizable polyacetal having a functional group containing a polymerizable unsaturated bond in the terminal and side chain of the polyacetal chain can be obtained. By way of an example, the polyacetal having functional groups each containing a polymerizable unsaturated bond such as an ethylenically unsaturated bond in the both of the terminal and side chain of the polyacetal chain can be obtained by cationically or anionically polymerizing formaldehyde or trioxane as the main monomer, and a comonomer having an ethylenically unsaturated bond or other polymerizable unsaturated bond and being copolymerizable with the main monomer, in the presence of the chain transfer agent having the polymerizable unsaturated bond such as an ethylenically unsaturated bond.

The content of the polymerizable unsaturated bond such as the ethylenically unsaturated bond in the resultant polymerizable polyacetal (A2) is, for example, about 0.002 to 5 mole/kg (e.g. about 0.005 to 3 mole/kg), preferably about 0.01 to 2 mole/kg, and practically about 0.01 to 1 mole/kg. The content of the polymerizable unsaturated bond can be controlled according to the amounts of the comonomer having the polymerizable unsaturated bond, the chain transfer agent and others components, and comparatively large quantity of the modifying group can be introduced to the base polyacetal with an increasing content of the polymerizable unsaturated bond.

When the terminal of the polymerizable polyacetal (A2) is free, the polymerizable polyacetal (A2) may be stabilized by esterification with a carboxylic acid such as acetic acid, propionic acid or butyric acid, typically speaking.

[Polymerizable compound]

The modified polyacetal of the present invention is introduced with the residue of the polymerizable compound (B) having a modifying group to the base polyacetal (A). The modifying group of the polymerizable compound includes, for instance, an epoxy group, a carboxyl group, an acid anhydride group, an ester group, a hydroxyl group, an ether group, an amide group, an amino group, a nitrile group, an isocyanate group, an imide group, a cycloalkyl group, an aryl group and a heterocyclic group having a nitrogen atom as a hetero atom. Meanwhile, the nitrogen atom of the amide group and amino group may be substituted with a substituent. The polymerizable compound may be a polyfunctional compound (multifunctional compound) having the same or different modifying groups in the molecule. These modifying groups are useful for enhancing affinities for polymers and/or additives such as reinforcing agents or fillers. These polymerizable compounds can be used singly or in combination.

The polymerizable compound having a modifying group requires to have at least one polymerizable group per molecule. A compound having plural polymerizable groups is effective for obtaining a resin composition, which is suitable for blow molding or film molding (film formation), by adding the composition in a small amount to modify the base polyacetal and hence inhibiting an excess crosslinking and restraining increase of melt viscosity. When fluidity (flow property) is required as in a material for an injection molding application, it is preferable that the polymerizable compound has one polymerizable group (e.g. an ethylenic double bond, an acetylene bond) per molecule, in particular one ethylenically unsaturated bond per molecule in order to restrain crosslinking and to improve molding processabilities. Further, even if being a compound having plural polymerizable groups, a polymerizable compound which forms a linear polymer by intramolecular cyclization such as diallylamine may also be employed.

When the base polyacetal (A) is the polymerizable polyacetal (A2), the polymerizable group of the polymerizable compound (B) usually has addition-reactivity to the polymerizable unsaturated bond of the polymerizable polyacetal (A2). Such polymerizable functional group may preferably be an ethylenically unsaturated bond similar to the polymerizable polyacetal (A2).

As the compound having an epoxy group, there may be mentioned, for instance, allyl glycidyl ether, chalcone glycidyl ether and other glycidyl ethers; glycidyl (meth) acrylate, glycidyl vinylbenzoate, glycidyl allylbenzoate, glycidyl cinnamate, glycidyl cinnamylideneacetate, glycidyl ester of dimeric acid, an ester of an epoxidated stearyl alcohol and acrylic acid or methacrylic acid, and other glycidyl or epoxy esters; and epoxyhexene, limonene oxide and other epoxidated unsaturated chain-like or cyclic olefins. The glycidyl ether-series polymerizable compound also includes a compound shown by the formula (3) (e.g. N-[4-(2,3-epoxypropoxy)-3,5-dimethylbenzyl]acrylamide, etc.), as mentioned hereinafter. The preferred polymerizable compound having an epoxy group includes a glycidyl ether-series or glycidyl ester-series epoxy compound having (meth)acryloyl group.

Examples of the compound having a carboxylic group includes acrylic acid, methacrylic acid, propiolic acid, crotonic acid and other aliphatic unsaturated monocarboxylic acids; cinnamic acid and other aromatic unsaturated monocarboxylic acids; maleic acid, fumaric acid, itaconic acid, citraconic acid and other aliphatic unsaturated dicarboxylic acids; monomethyl maleate, monoethyl maleate, monobutyl maleate, monohexyl maleate, monooctyl maleate, mono-2-ethylhexyl maleate and other maleic acid monoesters, fumaric monoesters corresponding to these maleic monoesters, and other unsaturated dicarboxylic acid monoesters. The preferable compound having a carboxylic group includes (meth)acrylic acid, maleic acid and a monoalkyl maleate, typically speaking.

The compound having an acid anhydride group includes, for example, maleic anhydride, itaconic anhydride, citraconic anhydride, himic anhydride. Preferred compound having an acid anhydride group includes maleic anhydride.

Examples of the compound having an ester group include an ester of the polymerizable compound having a carboxylic group such as unsaturated mono- or di-carboxylic acid or the polymerizable compound having an acid anhydride group, and a hydroxy compound containing about 1 to 20 carbon atoms. As the hydroxy compound, there may be mentioned for instance methanol, ethanol, 1-propanol, 2-propanol, 1-butanol, 2-methyl-2-propanol, 1-hexanol, 1-octanol, 1-dodecanol, stearyl alcohol and other aliphatic alcohols each having about 1 to 20 carbon atoms (preferably, about 4 to 20 carbon atoms), cyclohexanol and other alicyclic alcohols, benzyl alcohol and other aralkyl alcohols, phenol and other phenolic alcohols.

Examples of such polymerizable compound include methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, stearyl (meth)acrylate, phenyl (meth)acrylate, benzyl (meth)acrylate and other (meth)acrylates; dimethyl maleate, diethyl maleate, dibutyl maleate, dihexyl maleate, dioctyl maleate, di-2-ethylhexyl maleate, and fumaric esters corresponding to these maleates, and other unsaturated dicarboxylic acid esters.

The compound having an ester group also includes an ester of the polymerizable compound having a hydroxyl group as mentioned hereafter, and an organic carboxylic acid. The compound having an ester group further includes vinyl acetate, vinyl propionate, vinyl butyrate, vinyl caprylate, vinyl laurate, vinyl myristate, vinyl oleate, vinyl stearate and other vinyl esters of organic carboxylic acids each having about 2 to 20 carbon atoms (preferably about 6 to 20 carbon atoms).

Desirable compound having an ester group includes a compound with a comparatively high boiling point, such as alkyl (meth)acrylates each having about 8 to 20 carbon atoms in the alkyl group, and vinyl esters each having about 10 to 20 carbon atoms in the organic carboxylic acid moiety.

As examples of the compound having a hydroxyl group, there may be mentioned allyl alcohol, 2-hydroxyethyl (meth)acrylate, 2-hydroxypropyl (meth)acrylate, butanediol mono(meth)acrylate, hexanediol mono(meth)acrylate, neopentyl glycol mono(meth)acrylate, glycerin mono(meth)acrylate, vinylphenol and so forth. The preferred polymerizable compound having a hydroxyl group includes a hydroxyalkyl (meth)acrylate, generally speaking.

As the compound having an ether group, there may be mentioned, for instance, methoxymethyl (meth)acrylate, ethoxymethyl (meth)acrylate, buthoxymethyl (meth)acrylate, methoxyethyl (meth)acrylate, ethoxyethyl (meth)acrylate, butoxyethyl (meth)acrylate and methoxystyrene.

Examples of the compound having a hydroxyl group and an ether group include diethylene glycol mono(meth)acrylate, triethylene glycol mono(meth)acrylate, polyethylene glycol mono(meth)acrylate, dipropylene glycol mono(meth)acrylate, tripropylene glycol mono(meth)acrylate, polypropylene glycol mono(meth)acrylate, polytetramethylene glycol mono(meth)acrylate and others.

The compound having an amide group includes, for example, acrylamide, methacrylamide, N,N-dimethylacrylamide, N,N-diethylacrylamide, N-isopropylacrylamide, N,N-dimethylaminopropylacrylamide, diacetoneacrylamide and other (meth)acrylamide and their derivatives; vinylsulfonamide, vinylsulfanilide, vinyl sulfone methylanilide, vinyl sulfone acetanilide and other vinyl sulfoneamides. Preferred example of the polymerizable compound having an amide group includes (meth)acrylamide and an N-substituted (meth)acrylamide.

As the compound having an amino group, there may be mentioned, for example, allylamine, diallylamine and other allyl compounds; 4-vinylaniline, N-vinyldiphenylamine and other vinyl compounds; N,N-dimethylaminoethyl (meth)acrylate, N,N-diethylaminoethyl (meth)acrylate and other (meth)acrylates.

Examples of the compound having an imide group include maleimide, an N-alkylmaleimide (e.g. N-methylmaleimide), N-phenylmaleimide, bismaleimide and other maleimides and their derivatives; N-vinylsuccinimide, N-vinylglutarimide, N-vinylphthalimide and other N-vinylpolycarboxylimide. The preferred polymerizable compound having an imide group includes maleimide and its derivatives.

The compound having a nitrile group includes, for instance, acrylonitrile, methacrylonitrile, 2-cyanoethyl (meth)acrylate and the like. Desirable polymerizable compound having a nitrite group includes (meth)acrylonitrile.

As examples of the compound having an isocyanate group, there may be mentioned vinyl isocyanate, methacryloyl isocyanate, m-(2-isocyano-2-propyl)-α-methylstyrene and so forth.

Examples of the compound having a cycloalkyl group or an aryl group include vinylcyclohexane, 2-vinyl-1-nonene, styrene, α-methylstyrene, p-chloromethylstyrene, p-methylstyrene, vinyltoluene, vinylnaphthalene, vinylanthracene and the like.

As examples of the compound having a heterocyclic group, there may be mentioned a compound having a nitrogen atom as a hetero atom, such as 2-vinylquinoline, 3-vinylpiperidine, 2-vinylpyrazine, 2-vinylpyridine, 4-vinylpyridine, N-vinylpyrrole, N-vinylindole, N-vinylcarbazole, N-vinylimidazole, N-vinyl-2-pyrrolidone, N-vinyl-ε-caprolactam and acryloylmorpholine. The polymerizable compound having a heterocyclic group also includes cyclic imino esters such as a compound having an oxazolone group (e.g. 2-vinyl-5-oxazolone, etc.) and cyclic imino ethers such as a compound having an oxazoline group (e.g. 2-vinyl-2-oxazoline). The preferred polymerizable compound having a heterocyclic group includes heterocyclic compounds each having a vinyl group bonded to the nitrogen atom as the hetero atom, and vinyl compounds each having an oxygen atom in addition to the nitrogen atom as the hetero atoms, such as a cyclic imino ester group and cyclic imino ether group.

The preferable modifying group of the polymerizable compound includes, for instance, an epoxy group, a carboxyl group, an acid anhydride group, an ester group, a hydroxyl group, an amide group in which a modifying group may be bonded to the nitrogen atom, an amino group, a nitrile group, an isocyanate group, an imide group, and the above-mentioned heterocyclic group (e.g. a cyclic imino ester group, a cyclic imino ether group, etc.). The desirable amide group includes an N-substituted amide group having a non-self condensable modifying group bonded to the nitrogen atom.

In particular, preferred polymerizable compound includes (i) glycidyl (meth)acrylate and other ethylenically polymerizable compounds each containing an epoxy group, (ii) (meth)acrylic acid and other ethylenically polymerizable compounds each having a carboxyl group, (iii) maleic anhydride and other ethylenically polymerizable compounds each having an acid anhydride group, or (iv) ethylenically polymerizable compounds each having an amide bond and an epoxy group.

The ethylenically polymerizable compound having (i) an epoxy group or (iv) an amide bond and an epoxy group includes a compound shown by the following formula (3).

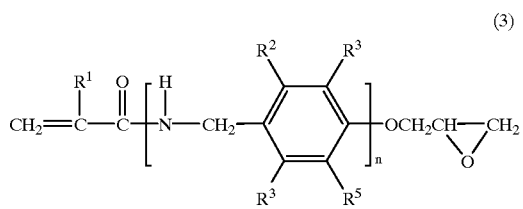

wherein $R^1$ represents a hydrogen atom or a methyl group, $R^2$ to $R^5$ independently represent a hydrogen atom, a halogen atom, an alkyl group, an alkoxy group, an alkoxycarbonyl group, an acyl group or an acyloxy group, and n denotes 0 or 1.

The halogen atom includes fluorine, chlorine, bromine and iodine atoms, and the alkyl group includes, for instance, methyl, ethyl, propyl, isopropyl, butyl, iso-butyl, sec-butyl, t-butyl, pentyl, hexyl, octyl and other alkyl groups each having about 1 to 10 carbon atoms. The desirable alkyl group includes lower alkyl groups each having about 1 to 6 carbon atoms, in particular about 1 to 4 carbon atoms.

As the alkoxy group, there may be mentioned methoxy, ethoxy, propoxy, butoxy, t-butoxy, pentyloxy, hexyloxy and other lower alkoxy groups each having about 1 to 6 carbon atoms, typically speaking.

Examples of the alkoxycarbonyl group include methoxycarbonyl, ethoxycarbonyl, propoxycarbonyl, butoxycarbonyl, t-butoxycarbonyl, pentyloxycarbonyl, hexyloxycarbonyl and other lower alkoxycarbonyl groups each having about 1 to 6 carbon atoms in the alkoxy moiety.

The acyl group includes, for example, formyl, acetyl, propionyl, butyryl, valeryl, pivaloyl and other lower acyl groups each having about 1 to 6 carbon atoms. As examples of the acyloxy group, there may be mentioned acetyloxy, propionyloxy, butyryloxy, valeryloxy and pivaloyloxy groups.

$R^2$ to $R^5$ may practically be a hydrogen atom, a halogen atom or a lower alkyl group, respectively. In particular, $R^2$ to $R^5$ may practically be, the same or different, a hydrogen atom or a lower alkyl group. The typically preferred compound (3) includes a compound in which $R^1$ is a hydrogen atom or methyl group, all of $R^2$ to $R^5$ are hydrogen atoms.

The compound in which n is 0 includes the glycidyl (meth)acrylate. As typical examples of the compound in which n is 1, there may be mentioned N-[4-(2,3-epoxypropoxy)phenylmethyl]acrylamide, N-[4-(2,3-epoxypropoxy)-3,5-dimethylbenzyl]acrylamide, N-[4-(2,3-epoxypropoxy)-3,5-diethylbenzyl]acrylamide, N-[4-(2,3-epoxypropoxy)-3,5-dibutylbenzyl]acrylamide and other N-[4-(2,3-epoxypropoxy)-3,5-dialkylbenzyl]acrylamide; N-[4-(2,3-epoxypropoxy)-2,6-dimethylbenzyl]acrylamide, N-[4-(2,3-epoxypropoxy)-2,5-dimethylbenzyl]acrylamide, N-[4-(2,3-epoxypropoxy)-2,3,5,6-tetramethylbenzyl] acrylamide and so forth.

The polymerizable compound may practically be in the liquid or solid form (non-gaseous form) at room temperature and at atmospheric pressure. Among these polymerizable compounds, compounds each having a boiling point at atmospheric pressure (ordinary pressure) of not lower than 70° C., preferably not lower than 100° C., and more preferably not lower than 120° C. may practically be used. The boiling point of the preferred polymerizable compound may practically be not lower than 140° C. at atmospheric pressure, such as maleic anhydride, (meth)acrylic acid, glycidyl (meth)acrylate and the compound shown by the formula (3) (e.g. N-[4-(2,3-epoxypropoxy)-3,5-dimethylbenzyl]acrylamide).

[Modified Polyacetal]

The modified polyacetal of the invention comprises (A) the base polyacetal as a base, and the residue of the polymerizable compound (B) having a modifying group, as introduced into the base polyacetal.

The amount of the introduced modifying group may be selected from a range as far as improving affinities for polymers or additives, and is, for instance, about 0.1 to 30% by weight (e.g. about 0.1 to 20% by weight), preferably about 0.2 to 25% by weight (e.g. about 0.2 to 15% by weight), and more preferably about 0.3 to 20% by weight (e.g. 0.3 to 10% by weight) in terms of the polymerizable compound relative to the base polyacetal. The modifying group may practically be introduced in a proportion of about 0.2 to 10% by weight as the polymerizable compound relative to the base polyacetal.

For the purpose of improving modification efficiency and utilization efficiency of the molded article, the modified polyacetal may preferably be a polyacetal modified by graft polymerization or addition polymerization of the polymerizable compound in the absence of (without coexistence of) a filler or reinforcing agent.

The bonding mode (bonding form) of the residue of the (B) polymerizable compound to (A) the base polyacetal as the base is not specifically limited. When the base polyacetal (A) is the polyacetal (A1), the residue of the polymerizable compound (B) may probably be introduced by graft polymerization. The residue X of the polymerizable compound is integrated or incorporated into the base polyacetal to with forming any constitutive unit of those shown by the following formulae.

—O—(CH$_2$)$_i$—CH(X)—(CH$_2$)$_j$—

—O—(CH$_2$)$_k$—X wherein i=0 to 5, j=0 to 5, i+j=0 to 5 and k=1 to 6, and X represents the residue of the polymerizable compound.

The residue X of the polymerizable compound may practically be integrated into the polyacetal mainly as the following constitutive unit:

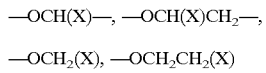

—OCH₂(X), —OCH₂CH₂(X)

wherein X has the same meaning as defined above.

When the base polyacetal (A) is the polymerizable polyacetal (A2), the residue of the polymerizable compound (B) may probably be introduced into the base polyacetal mainly in such a manner that the polymerizable compound (B) is additionally bonded to the polymerizable functional group of the polymerizable polyacetal (A2). That is, the residue of the polymerizable compound (B) may probably be bonded to the polyacetal by means of a reaction (mainly a radical-like addition reaction) of the polymerizable unsaturated bond of the polymerizable polyacetal (A2) with the polymerizable functional group (e.g. ethylenically unsaturated group) of the polymerizable compound (B) having the modifying group. Therefore, the bonding form of the residue of the polymerizable compound (B) to the polymerizable polyacetal (A2) may usually be such as to form a structure in which the modifying group is additionally introduced through a carbon-carbon bond formed by addition reaction (in some cases, further thought other divalent group), generally speaking. The bonding position of the residue of the polymerizable compound (B) may probably be settled depending mainly on the position of the polymerizable unsaturated bond previously introduced into the polymerizable polyacetal (A2). In other words, when the polymerizable unsaturated bond is present in the terminal of the polymerizable polyacetal (A2), the modifying group of the polymerizable compound (B) is additionally introduced into the terminal of the polymerizable polyacetal (A2). When the polymerizable polyacetal (A2) has the polymerizable unsaturated bond in a random position along with the backbone chain of the polyacetal, the modifying group of the polymerizable compound (B) may form a structure in which the modifying group is additionally introduced into a random portion as a side chain along with the backbone chain of the polymerizable polyacetal (A2). Further, when the polymerizable unsaturated bonds are present in the backbone chain (main chain) and in the terminal of the polymerizable polyacetal (A2), the modifying group of the polymerizable compound (B) can be additionally introduced principally into the backbone chain or terminal of the polymerizable polyacetal (A2). Accordingly, the use of the polymerizable polyacetal (A2) insures liberal control of the bonding position of the modifying group.

The molecular weight of the modified polyacetal of the present invention can be controlled or regulated within a comparatively wide range, and controlled to a comparatively high molecular weight which is not obtainable by a conventional modifying technology. In particular, the polymerizable polyacetal can advantageously be used as the base polyacetal for obtaining the modified polyacetal having a high molecular weight. Thus, the molecular weight (weight average molecular weight) of the modified polyacetal can be selected from a broad range according to the use of about 2,000 to 500,000, and is preferably about 2,000 to 400,000 and more preferably about 10,000 to 300,000, typically speaking.

[Production Method of Modified Polyacetal]

The modified polyacetal can be produced by allowing (A) the base polyacetal to react with (B) the polymerizable compound having the modifying group for the introduction of the residue of the polymerizable compound into the polyacetal. The base polyacetal (A) and the polymerizable compound (B) having the modifying group may be heated in the absence of (C) the free-radical initiator (polymerization initiator), but reaction of these compounds in the presence of the free-radical initiator (C) insures efficient introduction of the residue of the polymerizable compound. When a photopolymerization initiator (e.g. benzophenone or its derivative, a benzoin alkyl ether, benzyl, 2-chloroanthraquinone and other quinone derivatives), the reaction may be carried out by light irradiation such as ultraviolet irradiation or a high-energy irradiation such as an electron beam. Modification by means of heating and hence reacting the compounds is desirable for an efficient reaction in a simple and easy manner. When the polymerizable polyacetal (A2) is used as the base polyacetal (A), the unsaturated bond of the polymerizable polyacetal (A2) and the unsaturated bond of the polymerizable compound (B) are addition-polymerized with each other for introduction of the modifying group into the base polyacetal (A). This reaction may usually be a radical addition reaction, and the presence of the free-radical initiator (C) is effective for enhancement of addition reaction ratio.

The species of the free-radical initiator (C) is not strictly limited if only it is a compound having a function as a polymerization initiator which initiates polymerization of the polymerizable compound. As the free-radical initiator, use can be made of organic peroxides and other peroxides, azo compounds and other radical polymerization initiators.

Examples of the peroxide include t-butyl hydroperoxide, p-menthane hydroperoxide, cumene hydroperoxide, diisopropylbenzene hydroperoxide, 2,5-dimethylhexane-2,5-dihydroperoxide and other alkyl hydroperoxides; di-t-butyl peroxide, t-butylcumyl peroxide, dicumyl peroxide, t-butyl peroxycumene, 2,5-dimethyl-2,5-di(t-butylperoxy)hexane, 2,5-dimethyl-2,5-di(t-butylperoxy)hexyne-3, α,α'-bis(t-butylperoxy-m-isopropyl)benzene and other dialkyl peroxides; benzoyl peroxide, lauroyl peroxide, p-chlorobenzoyl peroxide and other diacyl peroxides; methyl ethyl ketone peroxide, 1,1-bis(t-butylperoxy)-3,3,5-trimethylcyclohexane, 1,1-bis(t-butylperoxy)cyclodecane and other alkylidene peroxides; n-butyl-4,4-bis(t-butylperoxy)valerate, t-butyl peroxybanzoate and other ester peroxides and so on.

As the azo compound, there may be mentioned, for instance, 1-[(1-cyano-1-methylethyl)azo]formamide, 2,2'-azobis{2-methyl-N-[1,1-bis(hydroxymethyl)ethyl] propionamide} and other azoamide compounds; 1,1-azobis (cyclohexane-1-carbonitrile), 2-phenylazo-4-methoxy-2,4-dimethylvaleronitrile, 2,2'-azobis[2-(hydroxymethyl)-propionitrile], azobisisobutyronitrile and other azonitrile compounds; 2,2'-azobis(2,4,4-trimethylpentane) and other alkylazo compounds.

As other free-radical initiator, use may be made of, for example, potassium persulfate, sodium persulfate, ammonium persulfate and other persulfates.

These free-radical initiators may be used singly, or in combination with those of the same or different species.

For the purpose of introducing the modifying group of the polymerizable compound (B) into the polyacetal with a high efficiency, preferred free-radical initiator includes, a compound having a temperature of not lower than 130° C., preferably not lower than 150° C., and more preferably not lower than 160° C. at a half-life period of one minute. Such free-radical initiator (free-radical generator) may practically be an alkyl hydroperoxide, a dialkyl peroxide, an ester peroxide (in particular, an alkyl hydroperoxide or a dialkyl peroxide), and the azo compound. Examples of such radical initiator include α,α'-bis(t-butylperoxy-m-isopropyl) benzene, 2,5-dimethyl-2,5-di(t-butylperoxy)-hexyne-3, 2,5-dimethyl-2,5-di(t-butylperoxy)hexane, dicumyl peroxide, 2-phenylazo-4-methoxy-2,4-dimethyl-valeronitrile, 2,2,2'-azobis(2,4, 4-trimethylpentane) and so forth.

The proportion of the polymerizable compound (B) having the modifying group can be selected within a range according to desired modification degree and use or application of the modified polyacetal, and is about 0.1 to 30 parts by weight, preferably about 0.2 to 25 parts by weight (e.g. about 0.3 to 25 parts by weight), more preferably about 0.3 to 20 parts by weight (e.g. about 0.5 to 20 parts by weight) and practically about 1 to 20 parts by weight relative to 100 parts by weight of the base polyacetal (A), for instance. When the proportion of the polymerizable compound (B) is small, modifying degree of the base polyacetal is low, and when the proportion is excessive, unreacted polymerizable compound (B) would remain, a homopolymer would form, or mechanical characteristics of the polyacetal may occasionally be sacrificed depending on the species of the polymerizable compound.

The relative proportion of the free-radical initiator (C) to the base polyacetal (A) may be selected within a range as far as inhibiting the base polyacetal from having an excessively low molecular weight and not deteriorating the modification efficiency, and is, relative to 100 parts by weight of the base polyacetal (A), not greater than 3.5 parts by weight (e.g. about 0.01 to 3.5 parts by weight), preferably about 0.01 to 3 parts by weight, and more preferably about 0.01 to 1.5 part by weight, for example. The free-radical initiator (C) may practically be used in an amount of about 0.05 to 0.5 part by weight relative to 100 parts by weight of the base polyacetal (A). The ratio of the free-radical initiator (C) relative to the total amount of the base polyacetal (A) and the polymerizable compound (B) can be selected from a range according to introduced amount of the modifying group, molecular weight of the modified polyacetal, half-life of the free-radical initiator at the treating temperature, amount of the polymerizable compound, treating temperature, treating period or other factors. The ratio of the free-radical initiator is, for instance not greater than 2.5 parts by weight (e.g. about 0.01 to 2.5 parts by weight), preferably about 0.01 to 2 parts by weight, more preferably about 0.01 to 1 part by weight, and practically about 0.02 to 0.5 part by weight (e.g. about 0.05 to 0.5 part by weight) relative to 100 parts by weight of the total amount of the base polyacetal (A) and the polymerizable compound (B). When the amount of the free-radical initiator (c) is excessively small, the modification degree due to the polymerizable compound (B) is liable to be sacrificed, and when it is excessively large, the modification degree is not so improved. Depending on the species of the free-radical initiator, the base polyacetal may be excessively decomposed when the free-radical initiator (C) is used in an excess amount.

The relative proportion of the free-radical initiator (C) to 100 parts by weight of the polymerizable compound (B) may practically be about 0.1 to 25 parts by weight, preferably about 0.5 to 15 parts by weight, and more preferably about 1 to 10 parts by weight.

The method which insures modification of the base polyacetal (A) in a simple and easy manner includes a process which comprises mixing the base polyacetal (A) and the polymerizable compound (B) having the modifying group in a molten state of the base polyacetal (A) and in the presence of the free-radical initiator (C), in particular kneading the components in a molten state of the base polyacetal (melting-kneading method).

For the melting-mixing and melting-kneading treatments, conventional mixer and kneader, such as an extruder, Brabender, kneader, Bumbury's mixer, roll mill and so on can be employed. Preferred melting-mixer or kneader includes a closed apparatus such as an extruder and kneader. The kneading temperature may be selected within a range from the melting point to the decomposing point of the base polyacetal, and preferably the temperature is higher than the melting point of the base polyacetal by about 5 to 70° C. (preferably about 10 to 50° C.). The treating time (treating period) may be selected within the range according to the mixing or kneading temperature, and is, for instance, about 20 seconds to 2 hours, preferably about 30 seconds to 1 hour, and practically about 30 seconds to 30 minutes.

The melting-mixing or melting-kneading can be effected by, for example, feeding or supplying respectively the base polyacetal (A), the polymerizable compound (B), and if necessary, the free-radical initiator (C), in turn, to the mixer or kneader, or by previously feeding a mixture comprising the two components (A) and (B) or a mixture comprising the three components (A), (B) and (C) to the mixer or kneader. The melting-mixing or melting-kneading may also be carried out in the presence of an antioxidant.

Meanwhile, when the base polyacetal (A) and the free-radical initiator (C) are melting-mixed or melting-kneaded in the absence of the polymerizable compound (B), the molecular weight of the base polyacetal would be significantly decreased due to the free-radical initiator. To the contrary, the melting-mixing or melting-kneading of the base polyacetal (A) and the free-radical initiator (C) in the presence of the polymerizable compound (B) insures modification of the polyacetal by the polymerizable compound, and inhibits excessive decrease of the molecular weight of the base polyacetal, while it depending on the amount of the free-radical initiator. Therefore, when the polymerizable compound (B) having the modifying group is added to a molten mixture comprising the base polyacetal (A) and the free-radical initiator (C), and the resultant mixture is mixed in a molten state of the base polyacetal, the modified polyacetal modified with the polymerizable compound and having a comparatively low molecular weight. Such modified polyacetal can be used as a compatibilizing agent (compatibilizer), an adhesion improving agent for resins, metals, adhesives or paints (coatings).

In order to utilize the free-radical initiator effectively in the modification and to enhance the efficiency of modification due to the polymerizable compound, useful process is (i) a process which comprises mixing or kneading the three components of the base polyacetal (A), the polymerizable compound (B) having the modifying group and the free-radical initiator (C) in a molten state of the base polyacetal, (ii) a process which comprises adding the free-radical initiator (C) to a co-existent system of the base polyacetal (A) and the polymerizable compound (B) and mixing or kneading the resultant mixture in a molten state of the base polyacetal, (iii) a process which comprises adding the free-radical initiator (C) to a mixture, in particular a homogeneous mixture (preferably a compounded mixture or molten mixture) of the base polyacetal (A) and the polymerizable compound (B) having the functional group and mixing or kneading the resultant mixture in a molten state of the base polyacetal. According to these processes, the modifying group of the polymerizable compound can efficiently be introduced to the base polyacetal with retaining high molecular weight and excellent characteristics of the base polyacetal. In particular, the processes (ii) and (iii) can advantageously be employed for enhancing the modification efficiency with inhibiting decrease of the molecular weight of the base polyacetal (A), in comparison with the process (i), and they are effective to obtain a modified polyacetal having a high molecular weight. In especial, the use of the polymerizable polyacetal provides a modified polyacetal with a high molecular weight with ease.

Such process can be effected by feeding or supplying the three components or compound (compounded product) thereof to an apparatus or device such as the extruder, or melting and mixing the base polyacetal and the polymerizable compound in the apparatus and supplying or injecting the free-radical initiator into the apparatus, and mixing or kneading the resultant mixture. The process can also be carried out by feeding a mixture of the compound and the free-radical initiator to the apparatus and mixing or kneading the resultant mixture. The compound may practically be used in the form of a powder or granular, or a pellet.

Further, the melting-mixing or melting-kneading may preferably be conducted in the absence of a reinforcing filler or other fillers for improving the modification degree due to the polymerizable compound and utilizing efficiency of the free-radical initiator. That is, when the melting-mixing or melting-kneading is conducted in the presence of a filler, control of the modification efficiency with respect to the base polyacetal and melt viscosity of the polymerizable compound can hardly be achieved, in many cases. In contrast with this, modification in the absence of a filler and reinforcing agent insures effective utilization of the free-radical initiator and the polymerizable compound for the modification of the base polyacetal, and utilization of the resultant modified polyacetal for various molded articles, since the polyacetal is not modified with the filler and the reinforcing agent, which are generally employed in a comparatively large quantity.

The modified polyacetal may be pelletized where necessary. The modified polyacetal may be applied to the use as a composite composition by incorporating a variety of other resins, additives or fillers to the modified polyacetal in the pelletizing.

In the modified polyacetal of the invention, the residue of the polymerizable compound having the modifying group is introduced into the base polyacetal by means of chemical bonding, but, occasionally, a product containing a homopolymer of a part of the polymerizable compound (B) or unreacted polymerizable compound (B) may be formed. The presence of these remained unreacted component and homopolymer is, however, not so significant for practical use in many cases.

The modified polyacetal of the invention has a comparatively high molecular weight and excellent in moldability (formability). Accordingly, even when the modified polyacetal with a high molecular weight is, if necessary through the melting-mixing or melting-kneading, subjected to molding or processing as intact, a molded article with high performances (properties) can be obtained.

Further, the modified polyacetal has high affinities, compatibilities and wettabilities for polymers and additives such as reinforcing agents and fillers, depending on the species and amount of the modifying group of the polymerizable compound. Therefore, the modified polyacetal may be subjected to molding or processing as a mixture with a polymer such as an unreacted polyacetal or other polymer. The proportion of the modified polyacetal in such mixture with a polymer may be selected within a range depending on the modification degree, the species of the polymer or other factors, and, the ratio of modified polyacetal/polymer equals about 5 to 95/95 to 5 (by weight), preferably about 10 to 90/90 to 10 (by weight), typically speaking.

If necessary, a resin composition containing an antioxidant, ultraviolet absorber or other stabilizer, an antistatic agent, a lubricant, a flame-retardant, a coloring agent or other additive can be subjected to the melting-mixing or melting-kneading process. For the purpose of enhancing or improving the modification efficiency of the base polyacetal due to the polymerizable compound, and utilizing efficiency of the free-radical initiator, the amount of the additive is preferably small, and is, for instance, not more than 10 parts by weight, preferably about 0.001 to 5 parts by weight, and more preferably about 0.01 to 3 parts by weight relative to 100 parts by weight of the total amount of the base polyacetal (polyacetal component) and the polymerizable compound.

A stabilizer is desirably incorporated into the modified polyacetal of the invention. Specially, when the radical initiator is used in the production process, incorporation of the stabilizer is important to maintain stability of the modified polyacetal in processing thereafter or in use. As the stabilizer, use may be made of a conventional stabilizer used for a polyacetal.

Addition of the antioxidant as the stabilizer among the above additives is useful for enhancing the stability of the modified polyacetal. The antioxidant includes, for instance, a hindered phenol, a hindered amine and other compounds. As the hindered phenol, there may be mentioned, for example, 2,6-di-t-butyl-p-cresol, 2,2'-methylenebis(4-methyl-6-t-butylphenol), 4,4'-methylenebis(2,6-di-t-butylphenol), 4,4'-butylidenebis(3-methyl-6-t-butylphenol), 1,6-hexanediolbis[3-(3,5-di-t-butyl-4-hydroxyphenyl) propionate], penta-erythritoltetrakis[3-(3,5-di-t-butyl-4-hydroxyphenyl) propionate], triethylene glycol-bis[3-(3-t-butyl-5-methyl-4-hydroxyphenyl)propionate], 1,3,5-trimethyl-2,4,6-tris(3,5-di-t-butyl-4-hydroxybenzyl) benzene, n-octadecyl-3-(4',5'-di-t-butylphenol) propionate, stearyl-β-(3,5-di-t-butyl-4-hydroxyphenol) propionate, distearyl-3,5-di-t-butyl-4-hydroxybenzyl phosphonate, 2-t-butyl-6-(3-t-butyl-5-methyl-2-hydroxybenzyl-4-methylphenyl acrylate, N,N'-hexamethylenebis(3,5-di-t-butyl-4-hydroxy-hydrocinnamide), 3,9-bis{2-[3-(3-t-butyl-4-hydroxy-5-methylphenyl)propionyloxy]-1,1-dimethylethyl}-2,4,8,10-tetraoxaspiro[5,5]undecane, 4,4'-thiobis(3-methyl-6-t-butylphenol), 1,1,3-tris(2-methyl-4-hydroxy-5-t-butylphenol)butane and so on.

The hindered amine includes, for instance, 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenyl-carbamoyloxy)-2,2,6,6-tetramethylpiperidine, bis-(2,2,6,6-tetramethyl-4-piperidyl) oxalate, bis(2,2,6,6-tetramethyl-4-piperidyl) malonate, bis-(2,2,6,6-tetra-methyl-4-piperidyl) adipate, bis(2,2,6,6-tetramethyl-4-piperidyl) sebacate, bis(1,2,2,6,6-pentamethyl-4-piperidyl) sebacate, bis-(1,2,2,6,6-pentamethyl-4-piperidyl) adipate, bis-(2,2,6,6-tetramethyl-4-piperidyl) terephthalate, 1,2-bis(2,2,6,6-tetramethyl-4-piperidyloxy)ethane, bis-(2,2,6,6-tetramethyl-4-piperidyl) hexamethylene-1,6-dicarbamate, tris(2,2,6,6-tetramethyl-4-piperidyl)benzene-1,3,5-tricarboxylate, phenyl-α-naphthylamine, phenyl-β-naphthylamine, N,N'-diphenyl-p-phenylenediamine, N-phenyl-N'-cyclohexyl-p-phenylenediamine, N-isopropyl-N'-phenyl-p-phenylenediamine and the like.

Examples of the other antioxidant include dimyristylthio dipropionate, dilaurylthio dipropionate, distearylthio dipropionate and other sulfur-containing antioxidants; triisodecyl phosphate, triphenyl phosphite and other phosphorus-containing antioxidants; 2,5-di-t-butylhydroquinone, 2,5-diamylhydroquinone and other hydroquinone-series antioxidants; 6-ethoxy-2,2,4-trimethyl-1,2-dihydroquinoline and other quinoline-series antioxidants; and mercaptobenzoimidazole.

These antioxidants may be employed independently or in combination. Preferred antioxidant includes hindered phenols (phenolic antioxidants) and hindered amines (amine-series antioxidants).

As described above, when the modification is conducted in the presence of the antioxidant, the antioxidant may be added to the unmodified base polyacetal (A) or may be added in the modification process. Further, the antioxidant may be added to the modified polyacetal which has been modified. The amount of the antioxidant is, relative to 100 parts by weight of the base polyacetal (A), about 0.001 to 2 parts by weight and preferably about 0.01 to 1 part by weight.

Furthermore, a variety of stabilizers for neutralizing or absorbing an acid or formaldehyde to be inactivated may be employed in a liberal combination. Such stabilizer includes, for instance, various polyamides, amidine compounds formed by dicyandiamide, melamine or their derivative, oxides or hydroxides of alkali metals or alkaline earth metals, and organic or inorganic salts. If required, a weather stabilizer (a light stabilizer) such as a benzotriazole and a benzophenone may also be used in combination. Preferred stabilizer system includes a stabilizer (stabilizing agent) comprising a combination of the antioxidant and the absorber for an acid and formaldehyde.

The method of the invention, where the base polyacetal and the polymerizable compound are heated for modification, insures efficient modification of the polyacetal with retaining the high performances (properties) of the polyacetal and hence provides the modified polyacetal. Namely, the modifying group can be introduced into the polyacetal with a comparatively high ratio, and hence a polymer having a molecular weight within a broad range can be obtained in comparatively simple and easy manner. Further, when the free-radical initiator is added to a compound or molten mixture of the polyacetal and the polymerizable compound, the polyacetal can be modified by the polymerizable compound having the modifying group with a high efficiency while inhibiting decrease of the molecular weight of the polyacetal to provide the modified polyacetal. Moreover, since the modifying group can directly be introduced into the polyacetal in a simple and easy manner with a high efficiency without coexistence of a reinforcing agent or filler, the modified polyacetal having an excellent utility can be produced.

INDUSTRIAL APPLICABILITY OF THE INVENTION

The modified polyacetal of the present invention is excellent in affinities and compatibilities for polymers, additives, reinforcing agents and/or fillers (bulking agents) due to the introduced modifying group of the polymerizable compound. Therefore, use of the modified polyacetal provides good dispersing form as a compounded composition with resins, additives or fillers within a broad range, and insures modification of materials covering a wide range, and hence the modified polyacetal can be utilized as a polymer for polymer alloy application by blending with other polymer.

Further, the modified polyacetal is suitable for applications as additives (e.g. a compatibilizing agent or compatibilizer) for improving mixing-dispersibility between a conventional polyacetal resin being inherently poor in compatibility and/or dispersibility and other substance, by incorporating to the both substances to be coexistent.

The modified polyacetal has a high molecular weight, and is excellent in mechanical characteristics and electrical characteristics in spite of being introduced with the modifying group. Further, in addition to having a high molding processability, the modified polyacetal has an excellent moldability (formability) with suppressing crosslinkage, and can be reutilized even after molding, when it is modified with a polymerizable compound having one ethylenically unsaturated bond. Accordingly, the modified polyacetal is processable or moldable into a molded article in a variety of forms (shapes) by means of various molding process such as injection molding, extrusion molding, blow molding or others. The modified polyacetal has a variety of characteristics, of which conventional polyacetals lack, such as enhanced or improved coating properties (painting properties), dye-affinities (coloring properties), printing qualities, adhesive properties and other properties of the product molded article

EXAMPLES

The following examples are intended to describe the present invention in detail but should by no means limit the scope of the invention.

The undermentioned base polyacetal (A), polymerizable compound (B) and free-radical initiator (C) were employed in examples and comparative examples.

(A) Base polyacetal
- A1-1: Polyacetal copolymer (Polyplastics Co., Ltd., trade name DURACON M25, melt flow rate 2.5 g/10 min. (190° C., 2.16 kg))
- A1-2: Polyacetal copolymer (Polyplastics Co., Ltd., trade name DURACON M90, melt flow rate 9 g/10 min. (190° C., 2.16 kg))

(B) Polymerizable compound
- B1: N-[4-(2,3-epoxypropoxy)-3,5-dimethylbenzyl] acrylamide (Kanegafuchi Chemical Industries Co., Ltd., trade name AXE)
- B2: Glycidyl methacrylate
- B3: Maleic anhydride
- B4: Acrylic acid
- B5: Diethyl maleate
- B6: Stearyl methacrylate
- B7: 2-Hydroxyethyl methacrylate
- B8: N-phenylmaleimide
- B9: Diallylamine
- B10: Acrylonitrile
- B11: N-vinylpyrrolidone
- B12: Styrene
- B13: Methacryloyl isocyanate (Nippon Paint Co., Ltd.)
- B14: 2-Vinyl-2-oxazoline The polymerizable compounds B2 to B12 were available from Tokyo Chemical Industries, Ltd., and the polymerizable compound B14 was synthesized according to the method described in Japanese Patent Application Laid-open No. 10773/1988 (JP-A-63-10773).

(C) Free-radical initiator
- C1: 2,5-dimethyl-2,5-di(t-butylperoxy)hexyne-3 (Nippon Oil and Fats Co., Ltd., trade name PERHEXYNE 25B)

C2: 2,5-dimethyl-2,5-di(t-butylperoxy)hexane (Nippon Oil and Fats Co., Ltd., trade name PERHEXA 25B)

C3: α,α'-bis(t-butylperoxy-m-isopropyl)benzene (Nippon Oil and Fats Co., Ltd., trade name PERBUTYL P)

C4: Dicumyl peroxide (Nippon Oil and Fats Co., Ltd., trade name PERCUMYL D)

C5: 2-Phenylazo-4-methoxy-2,4-dimethylvaleronitrile (Wako Pure Chemical Industries, Ltd., trade name V-19)

C6: 2,2'-azobis(2,4,4-trimethylpentane) (Wako Pure Chemical Industries, Ltd., trade name VR-110)

The modification amount (modifying proportion) due to the polymerizable compound was determined in the following manner. That is, the modified polyacetal was purified by reprecipitation method for removing the component (B) which had not been bonded to the base polyacetal, and the amount of the component (B) introduced into the base polyacetal was determined by proton NMR and indicated in terms of % by weight as the proportion relative to the base polyacetal. Incidentally, the reprecipitation was conducted as follows. Namely, a solution of 150 mg of the modified polyacetal and 4 ml of hexafluoroisopropanol was added dropwise to the undermentioned solvent according to the species of the component (B), and precipitated polymer was recovered by filtration. By repeating this process three times or more, the modified polyacetal was purified.

| Component (B) | Solvent for reprecipitation |
| --- | --- |
| B1 | Acetone |
| B2, B3, B5, B7 to B9, B11 to B14 | Chloroform |
| B4 | Methanol |
| B6 | Isopropyl acetate |
| B10 | Dimethyl sulfoxide |

Example 1

To 95 parts by weight of a polyacetal (A1-1) was added and dry blended 5 parts by weight (5.3 parts by weight relative to 100 parts by weight of the polyacetal) of a polymerizable compound (B1), and the resultant mixture was molten and kneaded at 190° C. for about 2 minutes by means of a Brabender mixer to give a modified polyacetal.

Example 2

A modified polyacetal was obtained in the same manner as Example 1, except for dry blending 95 parts by weight of a polyacetal (A1-1), 5 parts by weight (5.3 parts by weight relative to 100 parts by weight of the polyacetal) of a polymerizable compound (B1) and 0.1 part by weight (0.11 part by weight relative to 100 pats by weight of the polyacetal) of a free-radical initiator (C1).

Example 3

A polyacetal (A1-1, 95 parts by weight) and 5 parts by weight of a polymerizable compound (B1) were dry-blended, and the resultant mixture was molten and kneaded at 190° C. for about 2 minutes with the use of a Brabender mixer. To the molten and kneaded product was added 0.1 part by weight of a free-radical initiator (C1) and the resultant mixture was further kneaded for 2 minutes to provide a modified polyacetal.

Example 4

A polyacetal (A1-1, 95 parts by weight) was molten and kneaded with the use of a Brabender mixer, and thereto was added 0.1 part by weight of a free-radical initiator (C1) and the resultant mixture was kneaded for 1 minute. To the kneaded product was added 5 parts by weight of a polymerizable compound (B1) and the resultant mixture was kneaded for 2 minutes to give a modified polyacetal.

Comparative Example 1

To 95 parts by weight of a polyacetal (A1-1) was added 0.1 part by weight (0.11 part by weight relative to 100 parts by weight of the polyacetal) of a free-radical initiator (C1) without adding a polymerizable compound, and the resultant mixture was molten and kneaded in the similar manner to Example 2.

The modifying proportion and melt flow rate (MFR, unit: g/10 min., temperature 190° C., load 2.16 kg) of the polyacetals each obtained in Examples 1 to 4 and Comparative Example 1 were determined, and the results are set forth in Table 1. According to Comparative Example 1, the melt viscosity of the sample was remarkably low and hence discharge rate (outflow rate) from a melt indexer was extremely high so that a precise determination could not be achieved.

TABLE 1

| | Component A1-1 part by weight | Component B1 part by weight | Component C1 part by weight | Modifying proportion (% by weight) | Melt flow rate (g/10 min.) |
| --- | --- | --- | --- | --- | --- |
| Example 1 | 100 | 5.3 | — | 0.3 | 4.6 |
| Example 2 | 100 | 5.3 | 0.11 | 0.9 | 18.9 |
| Example 3 | 100 | 5.3 | 0.11 | 1.6 | 16.1 |
| Example 4 | 100 | 5.3 | 0.11 | 0.5 | 70 |
| Comp. Ex. 1 | 100 | — | 0.11 | — | unmeasurable |

As apparent from comparison between Example 4 and Comparative Example 1 in Table 1, excessive decrease of the molecular weight of the modified polyacetal can be inhibited by modification in the presence of the polymerizable compound. Further, it is clear from comparison between Examples 1 to 3, addition of the free-radical initiator insures high modifying proportion of the polymerizable compound. Further addition of the free-radical initiator to a mixture of the polyacetal and the polymerizable compound provides further increase of the modifying proportion with inhibiting decrease of the molecular weight of the modified polyacetal.

Examples 5 to 9

The polyacetal component (A) and the polymerizable compound (B) were dry-blended with each other in proportions shown in Table 2, and the resultant mixture was molten and kneaded at a temperature of 190° C. for about 2 minutes with the use of a biaxial extruder to give a pellet of a modified polyacetal.

Examples 10 to 40

In proportions set forth in Table 2 and Table 3, Component (A), the polyacetal, and Component (B), the polymerizable compound, were dry blended, and the resultant mixture was molten and kneaded at 190° C. for about 2 minutes using a biaxial extruder to give a pellet. After dry-blending this pellet with Component (C), the free-radical initiator, the resultant mixture was further molten and kneaded at 190° C. for about 2 minutes by using a biaxial extruder to give a pelet of a modified polyacetal.

The results are shown in Tables 2 and 3. As apparent from Tables 2 and 3, the polyacetal can be modified by means of processes according to the examples.

The obtained molded piece was previously irradiated, as a surface activating treatment, with an ultraviolet ray with a short wave-length (using an ultraviolet ray irradiation apparatus provided with a low pressure mercury lamp having a main wave length of 253.7 nm and output 200 W) for 30 seconds, and a predetermined pad-printing was conducted on the molded piece using an ultraviolet ray-curable printing ink (Dainippon Ink Co., Ltd., DAICURE ssp WHITE). The printing coating layer was cured with an ultraviolet irradiation (an ultraviolet irradiation apparatus provided with a high pressure mercury lamp having a main wave-length of 365 nm and output of 120 W) while the test piece was carried at a rate of 1.5 m/minute to give an evaluation sample.

TABLE 2

|  | Component (A) | | Component (B) | | Component (C) | | Modifying proportion |
|---|---|---|---|---|---|---|---|
|  | Species | Part by weight | Species | Part by weight | Species | Part by weight | (weight %) |
| Example 5 | A1-1 | 100 | B1 | 5.3 | — | — | 0.4 |
| Example 6 | A1-1 | 100 | B2 | 5.3 | — | — | 0.3 |
| Example 7 | A1-1 | 100 | B3 | 5.3 | — | — | 0.3 |
| Example 8 | A1-1 | 100 | B8 | 5.3 | — | — | 0.6 |
| Example 9 | A1-2 | 100 | B8 | 5.3 | — | — | 0.6 |
| Example 10 | A1-1 | 100 | B1 | 5.3 | C1 | 0.11 | 1.7 |
| Example 11 | A1-1 | 100 | B2 | 5.3 | C1 | 0.11 | 1.5 |
| Example 12 | A1-1 | 100 | B3 | 5.3 | C1 | 0.11 | 2.0 |
| Example 13 | A1-1 | 100 | B4 | 5.3 | C1 | 0.11 | 0.8 |
| Example 14 | A1-1 | 100 | B5 | 5.3 | C1 | 0.11 | 2.2 |
| Example 15 | A1-1 | 100 | B6 | 5.3 | C1 | 0.11 | 1.9 |
| Example 16 | A1-1 | 100 | B7 | 5.3 | C1 | 0.11 | 1.1 |
| Example 17 | A1-1 | 100 | B8 | 5.3 | C1 | 0.11 | 2.3 |
| Example 18 | A1-1 | 100 | B9 | 5.3 | C1 | 0.11 | 0.6 |
| Example 19 | A1-1 | 100 | B10 | 5.3 | C1 | 0.11 | 0.4 |
| Example 20 | A1-1 | 100 | B11 | 5.3 | C1 | 0.11 | 1.2 |

TABLE 3

|  | Component (A) | | Component (B) | | Component (C) | | Modifying proportion |
|---|---|---|---|---|---|---|---|
|  | Species | Part by weight | Species | Part by weight | Species | Part by weight | (weight %) |
| Example 21 | A1-1 | 100 | B12 | 5.3 | C1 | 0.11 | 1.0 |
| Example 22 | A1-1 | 100 | B13 | 5.3 | C1 | 0.11 | 0.5 |
| Example 23 | A1-1 | 100 | B14 | 5.3 | C1 | 0.11 | 1.3 |
| Example 24 | A1-1 | 100 | B1 | 1.0 | C1 | 0.10 | 0.5 |
| Example 25 | A1-1 | 100 | B1 | 11 | C1 | 0.11 | 3.1 |
| Example 26 | A1-1 | 100 | B1 | 25 | C1 | 0.25 | 7.5 |
| Example 27 | A1-1 | 100 | B1 | 5.3 | C1 | 0.21 | 2.1 |
| Example 28 | A1-1 | 100 | B1 | 5.3 | C1 | 0.32 | 2.2 |
| Example 29 | A1-1 | 100 | B1 | 5.3 | C2 | 0.11 | 1.5 |
| Example 30 | A1-1 | 100 | B1 | 5.3 | C3 | 0.11 | 1.9 |
| Example 31 | A1-1 | 100 | B1 | 11 | C3 | 0.11 | 3.3 |
| Example 32 | A1-1 | 100 | B1 | 25 | C3 | 0.25 | 7.5 |
| Example 33 | A1-1 | 100 | B1 | 5.3 | C3 | 0.21 | 2.4 |
| Example 34 | A1-1 | 100 | B1 | 5.3 | C3 | 0.32 | 2.8 |
| Example 35 | A1-1 | 100 | B1 | 5.3 | C4 | 0.11 | 0.6 |
| Example 36 | A1-1 | 100 | B1 | 5.3 | C5 | 0.11 | 1.2 |
| Example 37 | A1-1 | 100 | B1 | 5.3 | C6 | 0.11 | 1.2 |
| Example 38 | A1-2 | 100 | B1 | 5.3 | C1 | 0.11 | 1.6 |
| Example 39 | A1-2 | 100 | B1 | 11 | C1 | 0.11 | 2.8 |
| Example 40 | A1-2 | 100 | B1 | 5.3 | C6 | 0.11 | 1.1 |

Example 41 to 46 (Adhesion test)

The modified polyacetals obtained in Examples 9 to 12 were molded into plates (7 cm×5 cm×3 mm) (Examples 41 to 44). In Examples 45 and 46, a mixture of the modified polyacetal obtained in Example 25 and the polyacetal (A1-2) was injection-molded into a molded article.

Thereafter, 100 notches, as total, in the cross-cut form with each 10 raws and 10 colums at an interval of 1 mm horizontally and vertically were formed on the printed part of the evaluation sample. A commercially available cellophane tape was attached thereto and was removed or peeled off quickly and violently. The adhesion of the evaluation sample to the printed coating was evaluated by means of the number of remained cross-cuts without peeled off among the 100 cross-cuts. The results are set forth in Table 4.

Comparative Examples 2 and 3

The adhesion property of samples with respect to the printed coating was evaluated in the same manner as Examples 41 to 46 except for using unmodified polyacetals (A1-1) and (A1-2) in lieu of the modified polyacetal. The results are shown in Table 4.

As clearly shown in Table 4, the adhesion (adhesion property) to the printed coating is significantly improved by modification of the polyacetal.

TABLE 4

|  | Composition of polyacetal | Adhesion |
| --- | --- | --- |
| Example 41 | Example 9: 100 weight % | 73 |
| Example 42 | Example 10: 100 weight % | 100 |
| Example 43 | Example 11: 100 weight % | 95 |
| Example 44 | Example 12: 100 weight % | 97 |
| Example 45 | Example 25: 10 weight % A1-2: 90 weight % | 80 |
| Example 46 | Example 25: 30 weight % A1-2: 70 weight % | 90 |
| Comp. Ex. 2 | A1-1: 100 weight % | 0 |
| Comp. Ex. 3 | A1-2: 100 weight % | 0 |

Preparation Example 1 (Preparation of a polymerizable polyacetal (A2-1))

In this example was used a continuous mixing reactor provided with a barrel having a cross section in which two circles are partially overlapped in the plane configuration, and provided, outside thereof, with a jacket for flowing a heat transfer medium, and two rotation axes having numerous paddles gearing each other inside thereof. With passing a warm water at 80° C. through the jacket, and rotating the two rotation axes, trioxane containing 2.5% by weight of 1,3-dioxolan as a comonomer, and 0.8% by weight of allyl glycidyl ether was supplied continuously from one end of the reactor, while adding 40 ppm of boron trifluoride relative to the trioxan continuously. The reaction mixture discharged from the other end of the reactor was immediately pulvelized, and without delation, the pulvelized reaction mixture was put into water containing 0.1% by weight of triethylamine for inactivation of the polymerization catalyst. The formed polymer was washed, separated and dried. To 100 parts by weight of this polymer was added 0.05 part by weight of pentaerythritol tetrakis[3-(3,5-di-tert-butyl-4-hydroxyphenyl) propionate] (Irganox 1010, Ciba Geigy) as a stabilizer. The resultant mixture was molten and kneaded at 200° C. with the use of an extruder provided with a vent for stabilization to provide a pellet-like polyacetal copolymer (A2-1) having an ethylenic double bond.

This polyacetal copolymer (A2-1) was purified by repeating a process of dissolving it in a solvent (hexafluoroisopropanol) and reprecipitating, and the purified polyacetal copolymer was dissolved in hexafluoroisopropanol-d2, and the content of the ethylenic double bond was 0.44 mole/kg as determined by $^1$H-NMR.

The weight average molecular weight of the purified polyacetal copolymer was determined by the refraction index (RI) method and light scattering (LS) method with the use of a gel permission chromatography (GPC, Toso Co., Ltd.) using hexafluoroisopropanol as a solvent and carrier, and the weight average molecular weight was about 120,000.

The melt index (MI) of the polyacetal copolymer (A2-1) was determined at 190° C. under a load of 2.16 kg with using a melt indexer, and MI was 2.5 g/10 minutes.

Preparation Example 2 (preparation of a polymerizable polyacetal (A2-2))

A polyacetal copolymer (A2-2) was obtained in the same manner as Preparation Example 1 except that divinyl formal as a chain transfer agent was used in a proportion of 0.1% by weight in lieu of the allyl glycidyl ether as a comonomer in Preparation Example 1. As a result of analysis of this copolymer in the same manner as above, the content of the ethylenic double bond was 0.022 mole/kg, the weight average molecular weight was about 78,000 and MI was 8.7 g/10 minutes.

Preparation Example 3 (preparation of a polymerizable polyacetal (A2-3))

By using 1.3% by weight of 4-vinylbenzyl glycidyl ether in lieu of the allyl glycidyl ether used in Preparation Example 1, a polyacetal copolymer (A2-3) was obtained in the same manner as Preparation Example 1. The copolymer was subjected to the analysis in the same manner as above, and the content of the ethylenic double bond was 0.051 mol/kg, the weight average molecular weight was about 110,000, and MI was 2.7 g/10 minutes.

Comparative Preparation Example (preparation of a polyacetal copolymer (A1-3))

A polyacetal copolymer (A1-3) was obtained in the similar manner to Preparation Example 1, except for using trioxane containing 3.3% by weight of 1,3-dioxolan and 0.03% by weight of methylal without using allyl glycidyl ether used as a comonomer in Preparation Example 1. This copolymer did not contain an ethylenic double bond, and the average molecular weight thereof was about 120,000 and MI was 2.5 g/10 minutes.

Examples 47 to 71

A modified polyacetal was obtained by melting and kneading a mixture of the polyacetal (A2) obtained in the above preparation examples, and the polymerizable compound (B) shown in Table 1 and Table 2, if necessary together with the radical initiator (C), with the use of a Brabender mixer in a proportion and conditions set forth in the tables. In examples with a symbol "*" in the column of the kneading time in Tables 5 and 6, a modified polyacetal was obtained by kneading previously the polyacetal (A2) and the polymerizable compound (B) for 2 minutes, and thereafter adding the radical initiator (C) and melting and kneading the resultant mixture for further 3 minutes.

The codes for the polymerizable compounds (B) and the radical initiators (C) in Tables 5 and 6 have the same meanings as defined above.

The weight average molecular weight and MI of the modified polyacetal were determined in the same manner as above, and the introduction proportion (modifying proportion) of the residue of the polymerizable compound (B) was measured in the same manner as above. The results are set forth in Table 5 and Table 6.

TABLE 5

|  | Component (A) | | Component (B) | | Radical Initiator (C) | | Kneading temperature (° C.) | Kneading time (min.) | Modifying Proportion weight % | MI g/10 min. | Weight average molecular weight Mw |
|---|---|---|---|---|---|---|---|---|---|---|---|
|  | Species | Part by weight | Species | Part by weight | Species | Part by weight | | | | | |
| Example 47 | A2-1 | 95 | B1 | 5 | — | — | 190 | 2 | 0.7 | 4.3 | 94,000 |
| Example 48 | A2-2 | 95 | B1 | 5 | — | — | 190 | 2 | 0.4 | 13.0 | 71,000 |
| Example 49 | A2-3 | 95 | B1 | 5 | — | — | 190 | 2 | 0.7 | 4.1 | 95,000 |
| Example 50 | A2-1 | 95 | B1 | 5 | C1 | 0.1 | 185 | 5* | 2.9 | 12.0 | 73,000 |
| Example 51 | A2-2 | 95 | B1 | 5 | C1 | 0.1 | 185 | 5* | 2.2 | 41.3 | 44,000 |
| Example 52 | A2-3 | 95 | B1 | 5 | C1 | 0.1 | 185 | 5* | 3.0 | 12.7 | 72,000 |
| Example 53 | A2-1 | 95 | B1 | 5 | C3 | 0.1 | 185 | 5* | 3.0 | 11.8 | 73,000 |
| Example 54 | A2-1 | 95 | B1 | 5 | C1 | 0.02 | 185 | 5* | 1.2 | 6.7 | 84,000 |
| Example 55 | A2-1 | 95 | B1 | 5 | C1 | 0.3 | 185 | 5* | 3.5 | 38.5 | 45,000 |
| Example 56 | A2-1 | 95 | B1 | 1 | C1 | 0.1 | 185 | 5* | 0.7 | 15.5 | 60,000 |
| Example 57 | A2-1 | 95 | B1 | 10 | C1 | 0.1 | 185 | 5* | 4.7 | 10.8 | 75,000 |
| Example 58 | A2-1 | 95 | B1 | 25 | C1 | 0.3 | 185 | 5* | 10.8 | 25.7 | 51,000 |

Note: *The polyacetal (A2) was kneaded with the polymerizable compound (B) for 2 minutes, and the radical initiator (c) was added to the resultant, and the mixture was further kneaded for 3 minutes.

TABLE 6

|  | Component (A) | | Component (B) | | Radical Initiator (C) | | Kneading temperature (° C.) | Kneading time (min.) | Modifying Proportion weight % | MI g/10 min. | Weight average molecular weight Mw |
|---|---|---|---|---|---|---|---|---|---|---|---|
|  | Species | Part by weight | Species | Part by weight | Species | Part by weight | | | | | |
| Example 59 | A2-1 | 95 | B2 | 5 | C1 | 0.1 | 185 | 5* | 2.5 | 13.1 | 70,000 |
| Example 60 | A2-1 | 95 | B3 | 5 | C1 | 0.1 | 185 | 5* | 3.1 | 13.6 | 66,000 |
| Example 61 | A2-1 | 95 | B4 | 5 | C1 | 0.1 | 185 | 5* | 1.6 | 13.2 | 69,000 |
| Example 62 | A2-1 | 95 | B7 | 5 | C1 | 0.1 | 185 | 5* | 1.9 | 13.3 | 69,000 |
| Example 63 | A2-1 | 95 | B9 | 5 | C1 | 0.1 | 185 | 5* | 2.3 | 12.7 | 67,000 |
| Example 64 | A2-1 | 95 | B10 | 5 | C1 | 0.1 | 185 | 5* | 1.9 | 12.9 | 65,000 |
| Example 65 | A2-1 | 95 | B8 | 5 | C1 | 0.1 | 185 | 5* | 2.4 | 13.4 | 67,000 |
| Example 66 | A2-1 | 95 | B13 | 5 | C1 | 0.1 | 185 | 5* | 1.3 | 12.6 | 69,000 |
| Example 67 | A2-1 | 95 | B14 | 5 | C1 | 0.1 | 185 | 5* | 1.6 | 12.4 | 67,000 |
| Example 68 | A2-2 | 95 | B2 | 5 | C1 | 0.1 | 185 | 5* | 1.8 | 47.7 | 43,000 |
| Example 69 | A2-2 | 95 | B3 | 5 | C1 | 0.1 | 185 | 5* | 2.3 | 49.1 | 40,000 |
| Example 70 | A2-3 | 95 | B2 | 5 | C1 | 0.1 | 185 | 5* | 2.6 | 13.6 | 67,000 |
| Example 71 | A2-3 | 95 | B3 | 5 | C1 | 0.1 | 185 | 5* | 3.0 | 14.1 | 62,000 |

Note *: The polyacetal (A2) was kneaded with the polymerizable compound (B) for 2 minutes radical initiator (c) was added to the resultant, and the mixture was further kneaded for 3 minutes.

As obvious from the examples in Tables 5 and 6, melt-kneading of the polymerizable polyacetals (A2-1) to (A2-3) each having an ethylenically unsaturated bond, and the polymerizable compounds (B) results in enhancement of modification proportion due to the polymerizable compounds. In particular, when the radical initiator is incorporated as being coexistent, the introduction proportion of the modifying group due to the polymerizable compound can conspicuously be increased.

Examples 72 to 76

Each components (A) (B) and (C) were dry-blended previously, and the resultant mixture was molten and kneaded at a temperature of 190° C. for about 2 minutes by means of a biaxial extruder to provide a pellet of a modified polyacetal. The modifying proportion and MI for this pellet were determined in the same manner as defined above. The results are shown in Table 7.

TABLE 7

|  | Component (A) | | Component (B) | | Radical initiator (C) | | Modification proportion weight % | MI g/10 min. |
|---|---|---|---|---|---|---|---|---|
|  | Species | Part by weight | Species | Part by weight | Species | Part by weight | | |
| Example 72 | A2-1 | 95 | B1 | 5 | — | — | 0.7 | 4.2 |
| Example 73 | A2-1 | 95 | B1 | 5 | C1 | 0.1 | 3.0 | 11.8 |
| Example 74 | A2-1 | 95 | B2 | 5 | C1 | 0.1 | 2.6 | 12.9 |
| Example 75 | A2-1 | 95 | B3 | 5 | C1 | 0.1 | 3.1 | 13.4 |
| Example 76 | A2-1 | 95 | B1 | 10 | C1 | 0.1 | 4.6 | 10.0 |

Examples 77 to 82 and Comparative Examples 4 and 5 (Adhesion test)

The modified polyacetal each obtained in the above Examples 72 to 75 was molded into a plate (7 cm×5 cm×3 mm) with the use of an injection molding machine. Further, in Examples 81 and 82, a mixture of the modified polyacetal obtained in Example 76 and the unmodified polyacetal (A1-3) obtained in Comparative Preparation Example was injection molded. Furthermore, the polymerizable polyacetal (A2-1) according to Preparation Example 1, and the unmodified polyacetal (A1-3) according to Comparative Preparation Example were respectively molded in the same manner as above to give a plate sample piece for a comparison.

To the molded piece thus obtained, a short wave length ultraviolet ray was irradiated for 30 seconds as a surface activating treatment, and an ultraviolet ray-cured type printing ink (Dainippon Ink Co., Ltd., DAICURE ssp WHITE) was applied to the molded piece. The coating layer of the molded piece was cured by ultraviolet ray treatment.

Thereafter, the peeling test (adhesion test) was carried out in the following manner. That is, 100 notches, as total, in the cross-cut form with each 10 raws and 10 colums at an interval of 1 mm horizontally and vertically were formed on the coating layer in the cured part. A commercially available cellophane tape was attached thereto and was removed or peeled off in predetermined conditions. The adhesion (adhesive property) of the sample to the printed coating was evaluated by means of the number of remained cross-cuts without peeled off per 100 cross-cuts. The results are set forth in Table 8.

TABLE 8

|  | Composition of polyacetal | Adhesion |
| --- | --- | --- |
| Example 77 | Example 72: 100 weight % | 75 |
| Example 78 | Example 73: 100 weight % | 96 |
| Example 79 | Example 74: 100 weight % | 98 |
| Example 80 | Example 75: 100 weight % | 100 |
| Example 81 | Example 76: 10 weight % A1-3: 90 weight % | 85 |
| Example 82 | Example 76: 30 weight % A1-3: 70 weight % | 95 |
| Comp. Ex. 4 | A2-1: 100 weight % | 30 |
| Comp. Ex. 5 | A1-3: 100 weight % | 0 |

It is clear from Table 8 that the modified polyacetals each of which is introduced with a modifying group (Examples 77 to 82) exhibit significantly improved adhesion (adhesive properties) relative to a paint coating in comparison with the polyacetals to which a modifying group is not introduced (Comparative Examples 4 and 5).

Example 83

Boron trifluoride was added, in a proportion of 60 ppm relative to trioxane, to trioxane containing 3.3% by weight of 1,3-dioxolan, 0.8% by weight of allyl glycidyl ether and 100 ppm of methylal for cationic polymerization to give a polymerizable polyacetal.

This polymerizable polyacetal (A2) (95 parts by weight) and 5 parts by weight (5.3 parts by weight relative to 100 parts by weight of the polyacetal) of (B) a polymerizable compound [N-[4-(2,3-epoxypropoxy)-3,5-dimethylbenzyl] acrylamide (Kanegafuchi Chemical Industries, Ltd., trade name AXE)] were dry-blended, and the resultant mixture was molten and kneaded at a temperature of 190° C. for about 2 minutes using a biaxial extruder to provide a pellet. This pellet was dry-blended with 0.1 part by weight (0.11 part by weight relative to 100 parts by weight of the polyacetal) of (C) a free-radical initiator [α,α'-bis(t-butylperoxy-m-isopropyl)benzene (Nippon Oil and Fats Co., Ltd., trade name PERBUTYL P). The resultant mixture was further molten and kneaded at 190° C. for about 2 minutes with the use of the biaxial extruder to provide a pellet of a modified polyacetal.

The modifying proportion (modification proportion) of the modified polyacetal due to the polymerizable compound was 3.1% by weight. Meanwhile, the modifying proportion was determined in the following manner. That is, for removal of the polymerizable compound (B) which had not been bonded to the polymerizable polyacetal (A2), the modified polyacetal was purified by reprecipitation, and the amount of the polymerizable compound (B) introduced into the polymerizable polyacetal (A2) was determined by means of proton NMR. The modifying proportion due to the polymerizable compound was indicated in % by weight in terms of a ratio relative to the base polyacetal. The reprecipitation was conducted in such a manner that a solution containing 150 mg of the modified polyacetal in 4 ml of hexafluoroisopropanol was added dropwise to a solvent for reprecipitation (acetone), and the precipitated polymer was recovered by means of filtration. By repeating above process three times or more, the modified polyacetal was purified.

Example 84

To trioxane containing 3.3% by weight of 1,3-di-oxolan and 400 ppm of divinyl formal was added boron trioxide in a proportion of 60 ppm relative to the di-oxolan for cationic polymerization to give a polymerizable polyacetal.

A modified polyacetal was obtained in the same manner as Example 83, except for using the above-mentioned polymerizable polyacetal in lieu of the polyacetal used in Example 83. The modifying proportion of this modified polyacetal due the polymerizable compound was 2.5% by weight.

Example 85

To 500 parts by weight of cyclohexane containing 150 ppm of allyl alcohol as a chain transfer agent and $5.5 \times 10^{-4}$ mole/liter of dibutyltin methoxide was supplied formaldehyde gas with a purity of 99.9% at a rate of 100 parts by weight/hr. Accompanied with the supply of formaldehyde, cyclohexane containing the chain transfer agent and anionic polymerization catalyst in the same proportions as above was also supplied thereto at a rate of 500 parts by weight/hr. The polymerization was conducted at a temperature of 55° C. for 3 hours and the polymer was separated from cyclohexane, and was washed, dried and acetylated to prepare a polymerizable polyacetal.

A modified polyacetal was provided in the similar manner to Example 83 except for employing the polymerizable polyacetal instead of the polyacetal used in Example 83. The modifying proportion of the modified polyacetal due to the polymerizable compound was 2.4% by weight.

We claim:

1. A modified polyacetal which is the melt-phase graft polymerization reaction or addition reaction product of a reaction mixture comprising (A) a polymerizable base polyacetal having a functional group comprising a polymerizably unsaturated bond with (B) a polymerizable compound having a modifying group, in the presence of (C) a free radical initiator, wherein said base polyacetal is introduced with between 0.1 to 30% by weight, relative to the weight of the base polyacetal, of a residue of the polymerizable compound having at least one modifying group selected from the group consisting of an epoxy group, a carboxyl group, an acid anhydride group, an ester group, a hydroxyl group, an ether group, an amide group, an amino group, a nitrile group, an isocyanate group, an imide group, a cycloalkyl group, an aryl group and a heterocyclic group having a nitrogen atom as a hetero atom.

2. A modified polyacetal as claimed in claim 1, wherein said residue of the polymerizable compound is present in said melt-phase reaction mixture in an amount of 0.2 to 25% by weight relative to the weight of the base polyacetal.

3. A modified polyacetal as claimed in claim 1, wherein said modified polyacetal has a weight average molecular weight of 2,000 to 400,000.

4. A modified polyacetal as claimed in claim 1, wherein said functional group comprising the polymerizablly unsaturated bond of the polymerizable polyacetal is at least one functional group selected from the group consisting of a vinyl ether group, an allyl group and a vinylphenyl group.

5. A modified polyacetal as claimed in claim 1, wherein said polymerizable polyacetal is a polyacetal having, in a side chain and/or in a terminal, a functional group comprising an ethylenically unsaturated bond.

6. A modified polyacetal as claimed in claim 1, wherein said polymerizable compound containing a modifying group has at least one ethylenically unsaturated bond per molecule.

7. A modified polyacetal as claimed in claim 1, wherein said polymerizable compound containing a modifying group has one ethylenically unsaturated bond per molecule.

8. A modified polyacetal as claimed in claim 1, wherein said polymerizable compound having a modifying group is a compound having, per molecule, one ethylenic double bond, and at least one modifying group selected from the group consisting of an epoxy group, a carboxyl group, an acid anhydride group, an ester group, a hydroxyl group, an N-substituted amino group having a non-condensable modifying group bonded to the nitrogen atom, an amino group, a nitrile group, an isocyanate group, an imide group, a cyclic imino ester group and a cyclic imino ether group, and having a boiling point of not lower than 70° C. at atmospheric pressure.

9. A modified polyacetal as claimed in claim 1, wherein said polymerizable compound having a modifying group is a compound having, per molecule, at least one ethylenic double bond and at least one modifying group selected from the group consisting of an epoxy group, a carboxyl group, an acid anhydride group, an ester group, a hydroxyl group, an N-substituted amino group having a non-condensable functional group bonded to the nitrogen atom, an amino group, a nitrile group, an isocyanate group, an imide group, a cyclic imino ester group and a cyclic imino ether group, and a residue of said polymerizable compound is introduced by addition reaction in the ethylenic double bond site, with a proviso that said base polyacetal is a polymerizable polyacetal.

10. A modified polyacetal as claimed in claim 1, wherein said polymerizable compound having a modifying group is an ethylenically polymerizable compound having (i) an epoxy group, (ii) a carboxyl group, (iii) an acid anhydride group, or (iv) an amide bond and an epoxy group.

11. A modified polyacetal as claimed in claim 1, wherein said polymerizable compound having a modifying group is a maleic anhydride or a compound shown by the following formula

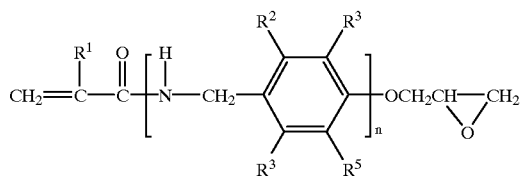

wherein $R^1$ represents a hydrogen atom or a methyl group; $R^2$, $R^3$, $R^4$ and $R^5$ represent, the same or different, a hydrogen atom, a halogen atom, an alkyl group, an alkoxy group, an alkoxycarbonyl group, an acyl group or an acyloxy group; and n denotes 0 or 1.

12. A modified polyacetal which is the melt-phase graft polymerization or addition polymerization reaction product of a reaction mixture comprised of (A) a base polyacetal having a melting point between about 120° C. to 185° C. with (B) a polymerizable compound having one ethylenically unsaturated bond per molecular and having a boiling point of not lower than 120° C. in the presence of (C) a free radical initiator and in the absence of a filler, wherein said base polyacetal is introduced with between 0.3 to 20% by weight, based on the weight of the base polyacetal, of a residue of the polymerizable compound having at least one modifying group selected from the group consisting of an epoxy group, an acid anhydride group, a hydroxyl group, an amide bond and an epoxy group, an amino group, a nitrile group, an isocyanate group, an imide group, a cyclic imino ester group and a cyclic imino ether group, and wherein said free radical initiator (C) is added to a coexistence system, a molten mixture or a pellet each comprising (A) the base polyacetal and (B) the polymerizable compound having a modifying group.

13. A modified polyacetal which is the addition reaction product of (A) a polymerizable polyacetal having a functional group comprising an ethylenically unsaturated bond with (B) a polymerizable compound having a modifying group, wherein said polymerizable polyacetal is introduced with a residue of the polymerizable compound having at least one modifying group selected from the group consisting of an epoxy group, a carboxyl group, an acid anhydride group, an ester group, a hydroxyl group, an ether group, an amide group, an amino group, a nitrile group, an isocyanate group, an imide group, a cycloalkyl group, an aryl group and a heterocyclic group having a nitrogen atom as a hetero atom, and a polymerizably unsaturated bond.

14. A method of producing a modified polyacetal which comprises the steps of:

(i) forming a coexistence system comprised of (A) a polymerizable base polyacetal having a functional group comprising a polymerizably unsaturated bond, and (B) a polymerizable compound having at least one modifying group selected from the group consisting of an epoxy group, a carboxyl group, an acid anhydride group, an ester group, a hydroxyl group, an ether group, an amide group, an amino group, a nitrile group, an isocyanate group, an imide group, a cycloalkyl group, an aryl group, and a heterocyclic group having a nitrogen atom as a hetero atom; and (ii) subjecting the coexistence system to graft polymerization reaction or addition reaction conditions by adding (C) a free radical initiator to the coexistence system and melt-mixing the resultant reaction mixture to introduce a residue of said polymerizable compound onto said base polyacetal.

15. A method of producing a modified polyacetal as claimed in claim 14, wherein the reaction is conducted by melting and heating said polymerizable polyacetal (A2) and said polymerizable compound (B).

16. A method of producing a modified polyacetal as claimed in claim 14, wherein the polymerizablly unsaturated bond of said polymerizable polyacetal is a vinyl group or an allyl group.

17. A method of producing a modified polyacetal as claimed in claim 14, wherein said polymerizable polyacetal is a polyacetal copolymer having an ethylenically unsaturated bond, said polyacetal copolymer being obtained by copolymerization of formaldehyde or trioxane as a principle monomer, and a cyclic ether or a cyclic formal substituted with a substituent having an ethylenically unsaturated bond as a comonomer.

18. A method of producing a modified polyacetal as claimed in claim 17, wherein said polymerizable polyacetal is the copolymerization reaction product of formaldehyde or trioxane as a principle monomer, and, as a comonomer, a compound shown by the following formula

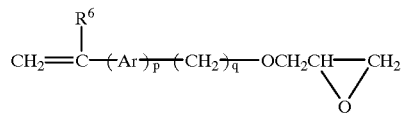

wherein Ar represents an arylene group or a cycloalkylene group, $R^6$ represents a halogen atom, a hydrogen atom or a methyl group, p denotes 0 or 1, and q represents an integer of 0 to 3, with a proviso that p and q are not concurrently 0.

19. A method of producing a modified polyacetal as claimed in claim 17, wherein said polymerizable polyacetal is a polyacetal copolymer having an ethylenically unsaturated bond which is obtained by copolymerizing, as a comonomer in the coexistence, a cyclic ether or a cyclic formal each being free from a polymerizablly unsaturated bond, with said polymerizable polyacetal (A2) and said polymerizable compound (B).

20. A method of producing a modified polyacetal as claimed in claim 15, wherein said polymerizable polyacetal is a polyacetal having a polymerizablly unsaturated bond which is a cationic polymerization or anionic polymerization reaction product of formaldehyde or trioxane as a principle monomer, optionally with a cyclic ether or a cyclic formal as a comonomer, in the presence of a chain transfer agent having a polymerizablly unsaturated bond.

21. A method of producing a modified polyacetal as claimed in claim 20, wherein said polymerizable polyacetal is a polyacetal having a polymerizablly unsaturated bond which is obtained by cationic polymerization or anionic polymerization of formaldehyde or trioxane as a principle monomer, optionally with a cyclic ether or a cyclic formal as a comonomer, in the presence of a straight-chain formal compound having a polymerizablly unsaturated bond, said formal compound being used as the chain transfer agent and shown by the following formula

wherein $R^7$ and $R^8$ independently represent a group having a polymerizablly unsaturated bond, an alkyl group, a cycloalkyl group, an aryl group or an aralkyl group, at least one of $R^7$ and $R^8$ is a group having a polymerizablly unsaturated bond, and x represents an integer of 1 to 10.

22. A method of producing a modified polyacetal as claimed in claim 14, wherein said polymerizable polyacetal is a polyacetal having a polymerizablly unsaturated bond which is obtained by esterification of a terminal of a polyacetal with a carboxylic acid having a polymerizablly unsaturated bond or an acid anhydride thereof, said polyacetal to be subjected to the esterification being formed by polymerization of formaldehyde or trioxane as a principle monomer, and occasionally with a cyclic ether or a cyclic formal as a comonomer.

23. A method of producing a modified polyacetal as claimed in claim 14, wherein the proportion of said polymerizablly unsaturated bond in said polymerizable polyacetal is 0.002 to 5 mol/kg.

24. A method of producing a modified polyacetal as claimed in claim 16, wherein (A) the base polyacetal is mixed with (B) the polymerizable compound having a modifying group with melting the base polyacetal in the presence of (C) a free radical initiator.

25. A method of producing a modified polyacetal as claimed in claim 24, wherein the mixing is carried out by kneading the components under heating.

26. A method of producing a modified polyacetal as claimed in claim 14, wherein (C) a free radical initiator is added to a coexistence system comprising (A) the base polyacetal and (B) the polymerizable compound having a modifying group and the resultant mixture is mixed under a molten state of the base polyacetal.

27. A method of producing a modified polyacetal as claimed in claim 26, wherein the reaction is conducted by;
    melting and kneading (A) said base polyacetal and (B) said polymerizable compound having a modifying group previously, and
    adding said free-radical initiator (C) to the resultant molten mixture.

28. A method of producing a modified polyacetal as claimed in claim 24, wherein (C) the free-radical initiator has a temperature of not lower than 130° C. at a half-life period of one minute.

29. A method of producing a modified polyacetal as claimed in claim 24, wherein said free-radical initiator is a peroxide or an azo compound.

30. A method of producing a modified polyacetal as claimed in claim 24, wherein said free-radical initiator (C) is at least one member selected from the group consisting of α,α'-bis(t-butylperoxy-m-isopropyl)benzene, 2,5-dimethyl-2,5-di(t-butylperoxy)hexyne-3, 2,5-dimethyl-2,5-di(t-butylperoxy)hexane, dicumyl peroxide, 2-phenylazo-4-methoxy-2,4-dimethylvaleronitrile and 2,2,2'-azobis(2,4,4-trimethylpentane).

31. A method of producing a modified polyacetal as claimed in claim 24, wherein said free-radical initiator (C) is added to a compounded mixture or a molten mixture of (A1) the polyacetal and (B) the polymerizable compound having a modifying group and the resultant mixture is mixed under a molten state of the polyacetal.

32. A method of producing a modified polyacetal as claimed in claim 14, wherein the mixing is conducted at a temperature higher than the melting point of said base polyacetal (A) by 5 to 70° C.

33. A method of producing a modified polyacetal as claimed in claim 14, wherein (B) the polymerizable compound having a modifying group is used in a proportion of 0.1 to 30 parts by weight relative to 100 parts by weight of (A) the base polyacetal.

34. A method of producing a modified polyacetal as claimed in claim 24, wherein (C) the free-radical initiator is used in a proportion of 0.01 to 2.5 parts by weight relative to 100 parts by weight of the total amount of (A) the base polyacetal and (B) the polymerizable compound.

35. A method of producing a modified polyacetal wherein (A) a base polyacetal having a melting point between about 120° C. to 185° C. is modified with (B) a polymerizable compound having at least one modifying group selected from the group consisting of an epoxy group, a carboxyl group, an acid anhydride group, a hydroxyl group, an amide bond and an epoxy group, an amino group, a nitrile group, an isocyanate group, an imide group, a cyclic imino ester group and a cyclic imino ether group, and (C) a free-radical initiator, which method comprises the steps of:
    adding, in the absence of a filler, 0.01 to 2 parts by weight of (C) the free-radical initiator to 100 parts by weight of a compounded mixture or a molten mixture of (A) the base polyacetal and (B) the polymerizable compound having a modifying group, and kneading the resultant mixture under a molten state of the base polyacetal, wherein the resultant mixture comprises 0.1 to 30 parts by weight of (B) the polymerizable compound having a modifying group relative to 100 parts by weight of (A) the base polyacetal.

36. A method of producing a modified polyacetal as claimed in claim 35, wherein said compounded mixture or molten mixture comprises 0.3 to 20 parts by weight of (B) the polymerizable compound having a modifying group relative to 100 parts by weight of (A) the base polyacetal.

37. A method of producing a modified polyacetal as claimed in claim 35, wherein said polymerizable compound has one ethylenically unsaturated bond per molecule and has a boiling point of not lower than 140° C. at atmospheric pressure.

38. A method of producing a modified polyacetal wherein (A) a base polyacetal is modified by using (B) an ethylenically unsaturated compound having a modifying group and (C) a free-radical initiator, which comprises:

adding, in the absence of a reinforcing filler, 0.01 to 1 part by weight of (C) the free-radical initiator to 100 parts by weight of a compounded mixture or molten mixture of (A) said base polyacetal and (B) the polymerizable compound having, per molecule, one ethylenically unsaturated bond and at least one modifying group selected from the group consisting of an epoxy group, a carboxyl group, an acid anhydride group and an N-substituted amide group having a non-condensable modifying group bonded to the nitrogen atom, and having a boiling point of not lower than 140° C. at atmospheric pressure, and melting and kneading the resulting mixture at a temperature where said base polyacetal can be molten to introduce a residue of said polymerizable compound to the base polyacetal in a proportion of 0.3 to 20% by weight relative to the base polyacetal.

39. A method of producing a modified polyacetal wherein (A) a base polyacetal having a melting point between about 120° C. to 185° C. is modified with (B) a polymerizable compound having at least one modifying group selected from the Group consisting of an epoxy group, a carboxyl group, an acid anhydride group, a hydroxyl group, an amide bond and an epoxy group, an amino group, a nitrile group, an isocyanate group, an imide group, a cyclic imino ester group and a cyclic imino ether group, and (C) a free-radical initiator, which method comprises:

adding in the absence of filler (B) a polymerizable compound having a modifying group to a molten mixture of (A) a base polyacetal and (C) a free-radical initiator, and mixing the resultant mixture under a molten state of the polyacetal, wherein the resultant mixture comprises 0.1 to 30 parts by weight of (B) the polymerizable compound having a modifying group relative to 100 parts by weight of (A) the base polyacetal.

40. A modified polyacetal as claimed in claim 1, wherein said graft polymerization or addition polymerization reactions are conducted by;

melting and kneading (A) said base polyacetal and (B) said polymerizable compound having a modifying group to form a molten mixture, and then adding said free-radical initiator (C) to the resultant molten mixture.

41. A method of producing a modified polyacetal as claimed in claim 14, which comprises in the step (ii) adding said free radical initiator (C) to the coexistence system, a molten mixture or a pellet each of which is comprised of (A) the base polyacetal and (B) the polymerizable compound having a modifying group.

42. A modified polyacetal which is the melt-phase graft polymerization reaction or addition reaction product of a reaction mixture comprising (A) a base polyacetal having a melting point between about 120° to 185° C. which is a polyacetal homopolymer or polyacetal copolymer comprising an oxymethylene group —$CH_2O$— as a principle repeating unit of a backbone chain, and 0 to 10 molar percent, relative to said oxymethylene group, of a copolymerizing unit of an oxyalkylene group $(CH_2)_nO$, wherein n is an integer of 2 to 6, with (B) a polymerizable compound having a modifying group, in the presence of (C) a free radical initiator and in the absence of a filler, wherein said base polyacetal is introduced with between 0.1 to 30% by weight, relative to the weight of the base polyacetal, of a residue of the polymerizable compound having at least one modifying group selected from the group consisting of an epoxy group, an acid anhydride group, a hydroxyl group, an ether group, an amide bond and an epoxy group, an amino group, a nitrile group, an isocyanate group, an imide group, a cycloalkyl group, a cyclic imino ester group and a cyclic imino ether group, and wherein said free radical initiator (C) is added to a coexistence system a molten mixture or a pellet each comprising (A) the base polyacetal and (B) the polymerizable compound having a modifying group.

43. The modified polyacetal of claim 42, wherein the polymerizable compound (B) has at least one modifying group selected from the group consisting of an epoxy group, an acid anhydride group, a hydroxyl group, an ether group, an amide bond and an epoxy group, an amino group, a nitrile group, an isocyanate group, an imide group and a cycloalkyl group.

44. The modified polyacetal of claim 42, wherein said polymerizable compound (B) having a modifying group is an ethylenically polymerizable compound having (i) an epoxy group, (ii) a carboxyl group, (iii) an acid anhydride group, or (iv) an amide bond and an epoxy group.

45. The modified polyacetal of claim 42, 43 or 44, wherein said free radical initiator (C) is added to a coexistence system, a molten mixture or a pellet each comprising (A) the base polyacetal and (B) the polymerizable compound having a modifying group.

46. A method of producing a modified polyacetal which comprises the step of:

(i) forming a coexistence system comprised of (A) a base polyacetal having a melting point between about 120° to 185° C., and (B) a polymerizable compound having at least one modifying group selected from the group consisting of an epoxy group, a carboxy group, an acid anhydride group, a hydroxyl group, an ether group, an amide bond and an epoxy group, an amino group, a nitrile group, an isocyanate group, an imide group, a cycloalkyl group, an aryl group a cyclic imino ester group and a cyclic imino ether group, in the absence of a filler; and (ii) subjecting the coexistence system to graft polymerization reaction or addition reaction conditions by adding (C) a free radical initiator to the coexistence system and melt-mixing the resultant reaction mixture to introduce a residue of said polymerizable compound onto said base polyacetal; wherein said base polyacetal is a polyacetal homopolymer or polyacetal copolymer comprising an oxymethylene group —$CH_2O$— as a principle repeating unit of a backbone chain, and 0 to 10 molar percent relative to said oxymethylene group, of a copolymerizing unit of an oxymethylene group $(CH_2)_nO$, wherein n is an integer of 2 to 6, and wherein the mixture comprises 0.1 to 30 parts by weight of (B) the polymerizable compound having a modifying group relative to 100 parts by weight of (A) the base polyacetal.

47. A method of producing a modified polyacetal as claimed in claim 46 which comprises in the step (ii) adding said free radical initiator (C) to the coexistence system, molten mixture or a pellet each of which is comprised of (A) the base polyacetal and (B) the polymerizable compound having a modifying group.

48. A modified polyacetal which is the melt-phase graft polymerization or addition polymerization reaction product of a reaction mixture comprised of (A) a base polyacetal having a melting point of between about 120° C. to 185° C. with (B) a polymerizable compound having one ethylenically unsaturated bond per molecular and having a boiling point of not lower than 120° C. in the presence of (C) a free radical initiator and in the absence of a filler, wherein said base polyacetal is introduced with between 0.3 to 20% by weight, based on the weight of the base polyacetal, of a residue of the polymerizable compound having a carboxyl group as modifying group, and wherein said free radical initiator (C) is added to a coexistence system, a molten mixture or a pellet each comprising (A) the base polyacetal and (B) the polymerizable compound having a modifying group.

49. A modified polyacetal which is the melt-phase graft polymerization reaction or addition reaction product of a reaction mixture comprising (A) a base polyacetal having a melting point which is between about 120° C. to 185° C. which is a polyacetal homopolymer or polyacetal copolymer comprising an oxymethylene group —$CH_2O$— as a principle repeating unit of a backbone chain, and 0 to 10 molar percent, relative to said oxymethylene group, of a copolymerizing unit of an oxyalkylene group —$(CH_2)_nO$—, wherein n is an integer of 2 to 6, with (B) a polymerizable compound having a modifying group, in the presence of (C) a free radical initiator and in the absence of a filler, wherein said base polyacetal is introduced with between 0.1 to 30% by weight, relative to the weight of the base polyacetal, of a residue of the polymerizable compound having a carboxyl group as modifying group, and wherein said free radical initiator (C) is added to a coexistence system, a molten mixture or a pellet each comprising (A) the base polyacetal and (B) the polymerizable compound having a modifying group.

50. A method of producing a modified polyacetal wherein (A) a base polyacetal is modified with (B) a polymerizable compound having a modifying group selected from the group of maleic anhydride, acrylic acid, methacrylic acid, glycidyl acrylate, glycidyl methacrylate or an N-[4-(2,3-epoxypropoxy)-3,5-dialkyl-benzyl] acrylamide, and (C) a free-radical initiator, which method comprises:

adding, in the absence of a filler, 0.01 to 2 parts by weight of (C) the free-radical initiator to 100 parts by weight of a compounded mixture, or a molten mixture of (A) the base polyacetal and (B) the polymerizable compound having a modifying group, and kneading the resultant mixture under a molten state of the base polyacetal.

* * * * *